(12) United States Patent
Sugimoto et al.

(10) Patent No.: US 8,760,444 B2
(45) Date of Patent: Jun. 24, 2014

(54) DISPLAY CONTROL DEVICE, OPERATION DISPLAY DEVICE, IMAGE PROCESSING APPARATUS, DISPLAY CONTROL METHOD AND TANGIBLE COMPUTER-READABLE RECORDING MEDIUM

(75) Inventors: Yasuaki Sugimoto, Tokyo (JP); Yasunori Satou, Tokyo (JP)

(73) Assignee: Konica Minolta Business Technologies, Inc. (JP)

( * ) Notice: Subject to any disclaimer, the term of this patent is extended or adjusted under 35 U.S.C. 154(b) by 211 days.

(21) Appl. No.: 13/548,118

(22) Filed: Jul. 12, 2012

(65) Prior Publication Data
US 2013/0027365 A1    Jan. 31, 2013

(30) Foreign Application Priority Data
Jul. 29, 2011    (JP) .................. 2011-167311

(51) Int. Cl.
*G06F 3/038*    (2013.01)
*G09G 5/00*    (2006.01)

(52) U.S. Cl.
USPC .......................................... 345/204; 345/690

(58) Field of Classification Search
USPC ............................................... 345/204, 690
See application file for complete search history.

(56) References Cited

U.S. PATENT DOCUMENTS
2008/0212123 A1    9/2008    Mizutani et al.

FOREIGN PATENT DOCUMENTS
JP    2008-207455    9/2008
JP    2011-138330    7/2011

OTHER PUBLICATIONS
Notice of Reason for Refusal for JP 2011-167311, mailed Nov. 12, 2013, 2 pgs.
Translation of the Notice of Reason for Refusal for JP 2011-167311, mailed Nov. 12, 2013, 3 pgs.

*Primary Examiner* — Ricardo L Osorio
(74) *Attorney, Agent, or Firm* — Squire Sanders (US) LLP

(57) ABSTRACT

Disclosed is a display control device which is configured to instruct a predetermined display unit to display information of one or more files stored in a predetermined storing device, wherein the display control device is configured to instruct the predetermined display unit to display the information of the stored file which can be processed in a processing mode selected from a plurality of processing modes of a predetermined processing apparatus for processing the file, by using a first display form, and to instruct the predetermined display unit to display the information of the stored file which cannot be processed in the selected processing mode, by using a second display form which is different from the first display form.

19 Claims, 16 Drawing Sheets

USB MEMORY

PRINT (COPY/PRINT) MODE

FILE SELECTION WINDOW

USB MEMORY

FILE SELECTION WINDOW

DISPLAY CONTROL DEVICE, OPERATION DISPLAY DEVICE, IMAGE PROCESSING APPARATUS, DISPLAY CONTROL METHOD AND TANGIBLE COMPUTER-READABLE RECORDING MEDIUM

BACKGROUND OF THE INVENTION

1. Field of the Invention

The present invention relates to a display control device, an operation display device, an image processing apparatus, a display control method and a tangible computer-readable recording medium for displaying information of files stored in a predetermined storing device on a display unit.

2. Description of Related Art

In an image processing apparatus for reading out an image data stored in a storing device, such as a portable recording medium, to print an image, for example, a list in which the thumbnail images or the like of the image data stored in the storing device are listed is displayed on the display unit and the selecting operation for selecting the image data to be printed from the list is received.

Further, in order to select the image to be printed more accurately, the printing apparatus which carries out the following process is disclosed (See Japanese Patent Application Publication No. 2008-207455). In the printing apparatus, in case that the information relating to the image data in which the image cannot be printed or of which the security is required to be unlocked is displayed among the information relating to the image data stored in the portable recording medium, the substitute images indicating that the image cannot be printed or the security of the image data is required to be unlocked are displayed instead of the thumbnail images.

The apparatus disclosed in Japanese Patent Application Publication No. 2008-207455, is a printing apparatus having only the printing function. Therefore, it is only necessary that the display forms of the files are dissimilated according to whether the image can be printed or not.

However, in the apparatus having a plurality of processing modes, such as the copy, the print, the data communication and the like, the processable statuses of each file, which indicate whether the file can be processed or not are different according to the processing modes. Therefore, when the processing mode is changed, the processable status of one file is often changed between before and after changing the processing mode. For example, in case of a video file, the file can be processed in the transmission mode for transmitting the file by attaching it to an electronic mail. However, the video file cannot be processed in the print mode for printing an image on recording paper.

As described above, in the apparatus having a plurality of processing modes, because the processable status of each file is changed according to the selected processing mode, it is required to suitably display the file information so as to respond to the change of the processing mode.

SUMMARY

To achieve at least one of the abovementioned objects, a display control device reflecting one aspect of the present invention, which is configured to instruct a predetermined display unit to display information of one or more files stored in a predetermined storing device, wherein the display control device is configured to instruct the predetermined display unit to display the information of the stored file which can be processed in a processing mode selected from a plurality of processing modes of a predetermined processing apparatus for processing the file, by using a first display form, and to instruct the predetermined display unit to display the information of the stored file which cannot be processed in the selected processing mode, by using a second display form which is different from the first display form.

Preferably, when the display control device instructs the predetermined display unit to display the information of the file which cannot be processed in the selected processing mode and can be processed in another processing mode by the predetermined processing apparatus, the display control device instructs the predetermined display unit to display an indication that the file can be processed in the another processing mode.

Preferably, when the display control device instructs the predetermined display unit to display the information of the file which can be processed in the another processing mode, the display control device instructs the predetermined display unit to display a processing mode switching button for switching the selected processing mode to the another processing mode.

Preferably, when the display control device instructs the predetermined display unit to display the information of the file which can be processed in the selected processing mode and can be processed in another processing mode, the display control device instructs the predetermined display unit to display an indication that the file can be also processed in the another processing mode.

Preferably, when the selected processing mode is changed, the display control device updates a display form for the information of the file to be displayed according to whether the file can be processed in the changed processing mode or not.

Preferably, in case that the selected processing mode is changed, when the display control device instructs the predetermined display unit to display the information of the file of which a processable status is not changed between before and after changing the processing mode, the display control device diverts display information of the file, which is used for displaying the information of the file before changing the processing mode, in the changed processing mode.

Preferably, when the file to be processed by the processing apparatus is selected among the files stored in the storing device, the display control device instructs the predetermined display unit to display the information of the files stored in the storing device.

Preferably, the storing device is provided in the display control device or is an external device which is connected to the display control device.

Preferably, the display unit is an external device which is connected to the display control device.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF PREFERRED EMBODIMENTS

Hereinafter, preferred embodiments of the present invention will be explained with reference to the accompanying drawings.

First Embodiment

Figure 1:
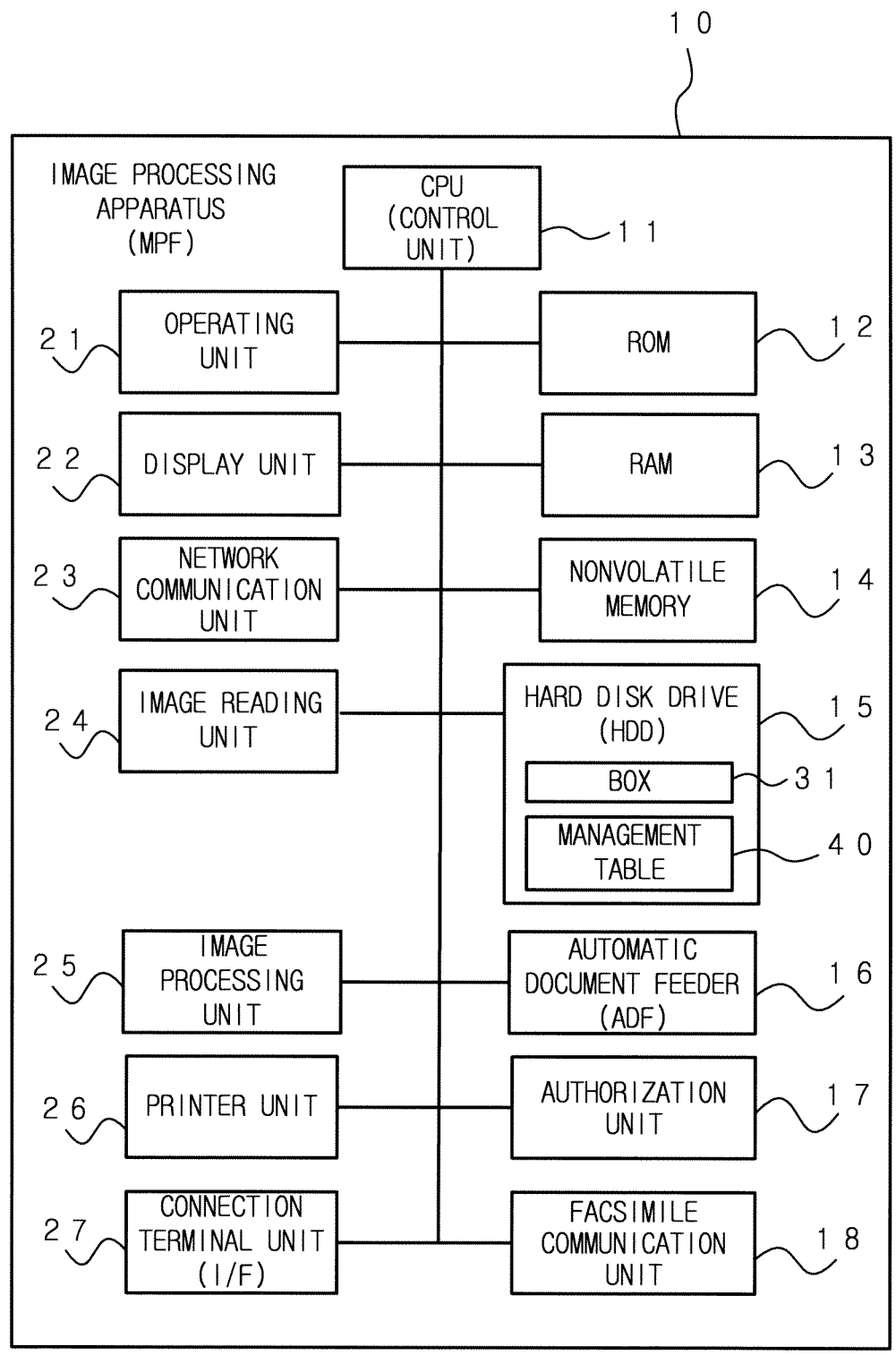
FIG. 1 a block diagram showing a schematic configuration of the image processing apparatus according to the first embodiment.

FIG. 1 shows the schematic configuration of the image processing apparatus 10 according to the first embodiment. The image processing apparatus 10 has a function to execute various types of jobs, such as a copy job for printing out an image on recording paper by reading an original optically, a scan job for storing an image data obtained by reading the original as a file or for transmitting it to an external terminal, a PC print job for printing out the image based on the print data received from an external terminal, on recording paper, a FAX job for carrying out the facsimile communication, a box job for printing out or transmitting a file stored in a storage area referred to as box, and the like. The image processing apparatus 10 has a function of the display control device for instructing the display unit 22 to display the information of the files stored in the predetermined storing device (for example, a hard disk drive (HDD) 15, an external memory connected to the connection terminal unit 27 or the like).

The image processing apparatus 10 comprises a CPU (Central Processing Unit) 11 as a control unit for wholly controlling the operation of the image processing apparatus 10. The CPU 11 is connected to the a ROM (Read Only Memory) 12, a RAM (Random Access Memory) 13, a nonvolatile memory 14, a hard disk drive 15, an automatic document feeder (ADF) 16, an authorization unit 17, a facsimile communication unit 18, an operating unit 21, a display unit 22, a network communication unit 23, an image reading unit 24, an image processing unit 25, a printer unit 26 and a connection terminal unit 27 via a bus.

By the CPU 11, a middleware, application programs and the like are executed on an OS (Operating System) program as a base.

In the ROM 12, various types of programs are stored. By executing the processes by the CPU 11 in accordance with these programs, the functions of the image processing apparatus 10 are realized.

The RAM 13 is used as a work memory for temporarily storing various data when the CPU 11 carries out the process in accordance with the programs and as an image memory for storing image data.

The nonvolatile memory 14 is a memory (flash memory) in which the stored contents are not damaged even if the image processing apparatus 10 is turned off, and is used for storing various setting information and the like.

The hard disk drive 15 is a large-capacity nonvolatile storing device. In the hard disk drive 15, files, such as print data, image data and the like, are stored. Further, in the hard disk drive 15, boxes 31 are prepared. Each box 31 is a storage area provided for each user or each group, and is used for storing the data, such as image data. In the hard disk drive 15, the management table 40 which will be described later, is stored.

The authorization unit 17 has a function to authorize a user which uses the image processing apparatus 10. The authorization unit 17 carries out the user authorization by checking the input user ID (Identification) and the input password by using the authorization information which is previously registered. The authorization method is not limited to this. For example, the fingerprint authorization, the vein authorization, the face authorization or the like can be used.

The facsimile communication unit 18 has a function to transmit and receive image data via a public line to/from an external device having the facsimile communication function. Further, the facsimile communication unit 18 has a function to carryout the communication via the Internet by the same process as the facsimile, that is, the Internet facsimile.

The display unit 22 is configured by a liquid crystal display or the like, and displays various types of windows, such as a standby window, an operation window, a file selection window, a setting window and the like. The operating unit 21 receives various types of operations, such as the input of the jobs from the user, the selection of the processing mode, the selection of the file to be processed, and the like. The operating unit 21 comprises a touch panel which is provided on the screen of the display unit 22. The touch panel detects a coordinate position in which the user pushes down. Further, the operating unit 21 comprises a numerical keypad, an alphabetical keypad, a start key and the like.

The network communication unit 23 has a function to transmit and receive the data to/from an external device or a server via a network, such as a LAN (Local Area Network). The image processing apparatus 10 communicates with the operation display device 200, the display control device 300 and the information processing apparatus 400 which will be described later, by using the network communication unit 23.

The image reading unit 24 has a function to obtain the image data by optically reading an original. For example, the image reading unit 24 comprises a light source for irradiating the original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The automatic document feeder 16 has a function to convey the original set to the original feed tray from the top page sheet by sheet and pass the original through the reading position of the image reading unit 24. Further, the automatic document feeder 16 has a function to discharge the original to the predetermined discharge position.

The image processing unit 25 carries out the rasterization processing for converting print data into image data, compression/decompression processing of image data and the like, in addition to the processings, such as enlargement/reduction and rotation of the image.

The printer unit 26 has a function to form an image based on image data, on recording paper. In this embodiment, the printer unit 26 is configured as the so-called laser printer for forming an image by the electrophotographic process. The laser printer comprises a conveying device for the recording paper, a photoconductive drum, a charging device, a laser unit, a developing device, a transfer and separation device, a cleaning device and a fixing device. The image may be formed by another system.

The communication terminal unit 27 is an interface unit for detachably connecting a storing memory which is an external device, such as a portable recording medium (external memory). Various types of external memories, such as a USB (Universal Serial Bus) memory, an SD (Secure Digital) card and the like can be connected to the communication terminal unit 27.

The types of processing (processing modes) which can be carried out by the image processing apparatus 10, include a print mode for printing out an image based on the image data obtained by reading an original or printing out an image of the file, a scan mode for reading the original by the image reading unit 24 to transmit image data, a facsimile mode for reading the original by the image reading unit 24 to carry out the facsimile transmission of the image, a box mode for printing out an image based on the image data stored in a box or transmitting the image data stored in a box, and the like.

The scan mode includes the Scan To E-mail mode for transmitting the read image data as an attached file of an electronic mail, the Scan To FTP mode for carrying out the FTP (File Transfer Protocol) transmission of the read image data, the Scan To Box mode for storing the read image data in a box, the Scan To USB mode for storing the read image data in a USB memory connected to the connection terminal unit 27, and the like.

The box mode includes the Box print mode for printing out the file stored in the box, and the Box transmission mode for transmitting the file stored in the box to an external device.

Further, the image processing apparatus 10 has a function to instruct the display unit 22 to display the list of the files stored in the external memory connected to the connection terminal unit 27 or the hard disk drive 15 and to receive the file selection operation from a user, for selecting the file to be processed in various processing modes from the list (referred to as "file information display function").

For example, in case that the print mode is selected as the processing mode, the file selected from the list of the files stored in the external memory or the hard disk drive 15 is the file to be printed. Incase that the facsimile mode is selected, the file selected from the above list is the file to be transmitted by the facsimile transmission. In case that the scan mode is selected, the file selected from the list of the files as image data obtained by reading the original is attached. In the Box transmission mode, the file selected from the list of the files stored in the box is attached and transmitted.

In each processing mode, the files which can be processed and the files which cannot be processed exist. For example, a moving file having the MPEG (Moving Picture Experts Group) format can be processed in the Scan To E-mail mode and the Box transmission mode, however, cannot be processed in the print mode.

The image processing apparatus 10 has the management table 40 in which whether the file can be processed or not in each processing mode is registered as a list according to each type of files, by storing it in the hard disk drive 15.

Figure 2:
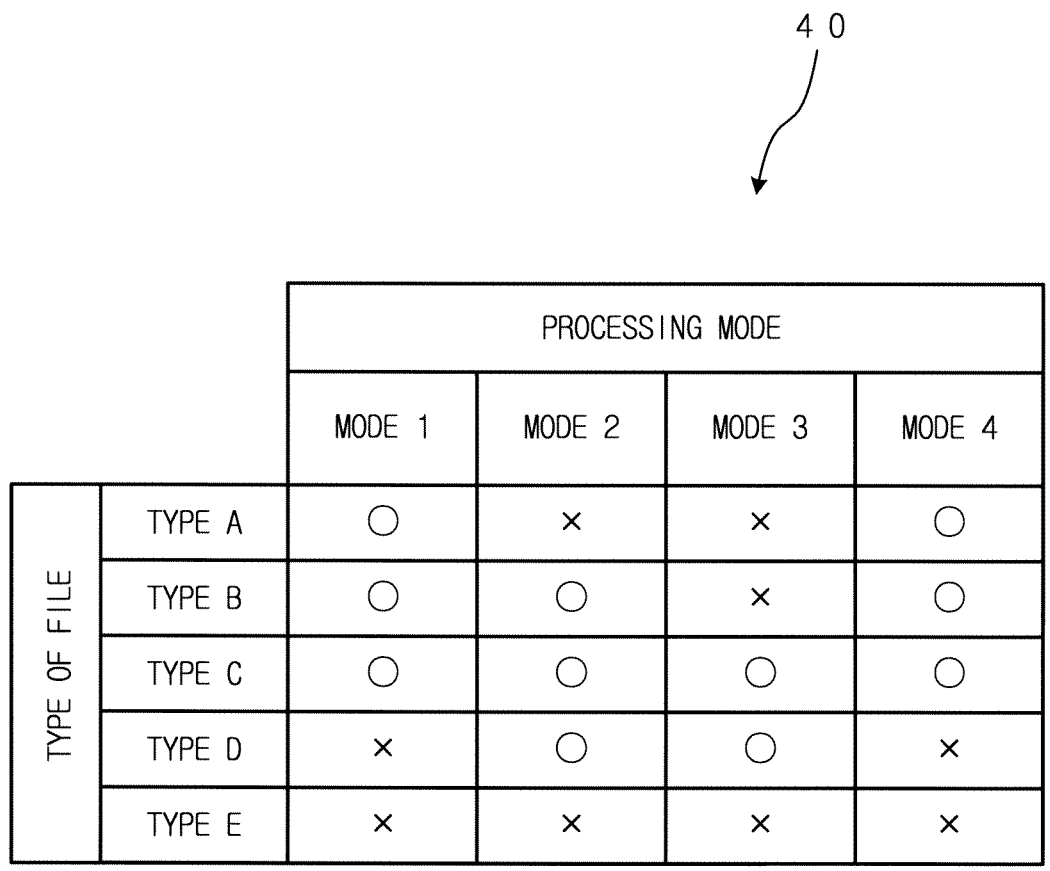
FIG. 2 is an explanatory view showing an example of the management table for judging whether the file can be processed or not.

FIG. 2 shows an example of the management table 40. In the management table 40, the processing modes 1 to 4 are registered as processing modes and the types A to E are registered as types of files. In the table, "O" indicates that the file can be processed and "X" indicates that the file cannot be processed. The processing modes include the print mode, the scan mode, the facsimile mode and the like, which are described above. The types of files include PDF (Portable Document Format), TIFF (Tagged Image File Format), BMP (Bitmap), JPEG (Joint Photographic Experts Group), MPEG and the like. The above-described processing modes and the above types of files are examples, and the processing modes and the types of files are not limited to the above-described ones.

Next, the operation in which the image processing apparatus 10 instructs the display unit 22 to display the list of the files stored in the storing device, will be explained. In the embodiment, the operation which is carried out when the external memory, such as the USB memory, is connected to the connection terminal unit 27, is explained.

In the embodiment, in case of the files (image data) which can be processed in the processing mode which is currently set, the information of the files is displayed by the preview in which the thumbnail images of the files are used or by the icon view in which the thumbnail images of the files are treated as icon designs (first display form). In case of the files which cannot be processed in the processing mode which is currently set, the simple view in which the attribute information of the files, such as the file name, is displayed by the character information without using the image information, is carried out (second display form).

In the simple view, the information as to whether the file can be processed or not in another processing mode is displayed. In the embodiment, the information as to whether the file can be processed or not in the current processing mode and in the other processing modes is displayed.

Further, in order to set the preview or the icon view for displaying the files which can be processed in the current processing mode, the default value is previously set by the administrator or the like. The set default value is stored in the nonvolatile memory 14 or the like. The display form can be optically switched between the preview and the icon view while the information of the files is displayed. The display data (image data) to be displayed by the preview, the icon view or the simple view are collectively referred to as the file display information.

Figure 3:
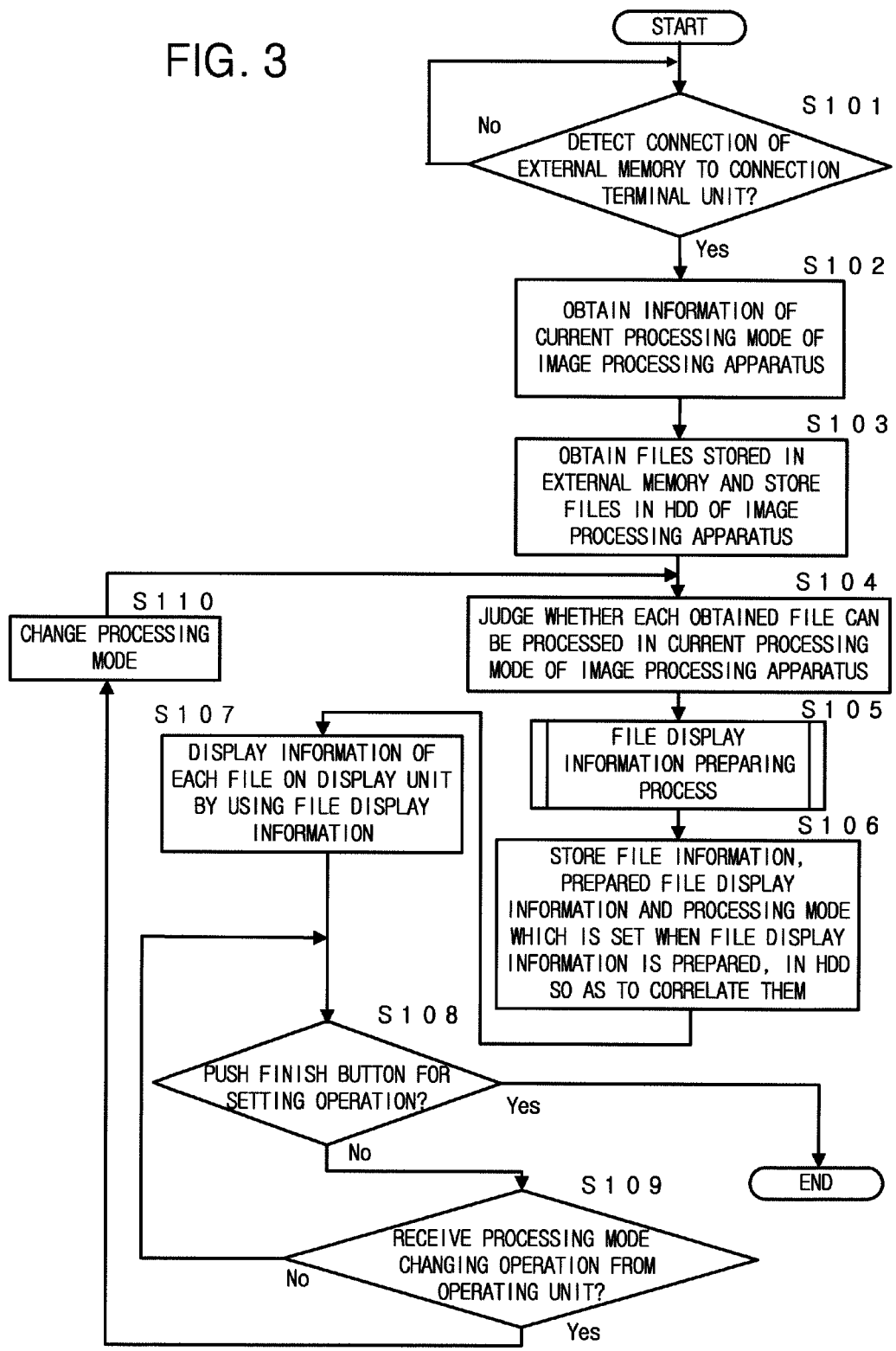
FIG. 3 is a flowchart showing the operation which is carried out when the CPU of the image processing apparatus instructs the display unit to display the list of flies stored in the external memory connected to the connection terminal unit.

FIG. 3 shows the operation which is carried out when the CPU 11 of the image processing apparatus 10 instructs the display unit 22 to display the list of the files stored in the external memory connected to the connection terminal unit 27. In this case, before the external memory is connected to the connection terminal unit 27, one processing mode is selected by a user.

When the CPU 11 of the image processing apparatus 10 detects that the external memory is connected to the connection terminal unit 27 (Step S101; Yes), the CPU 11 obtains the information indicating the processing mode which is currently selected (Step S102).

The CPU 11 reads out and obtains the files stored in the external memory connected to the connection terminal unit 27, and stores the files in the hard disk drive 15 (Step S103). Next, the CPU 11 judges whether each file obtained from the external memory can be processed in the current processing mode or not by referring to the management table 40 (Step S104). In this embodiment, the CPU 11 judges whether each file can be processed in all of the processing modes.

The CPU 11 carries out the file display information preparing process on the basis of the judgment result of Step S104 (Step S105). In the file display information preparing process, in case of the files which can be processed in the current processing mode, the file display information for the preview or the icon view is prepared. In case of the files which cannot be processed in the current processing mode, the file display information for the simple view is prepared.

The CPU 11 stores the information of the file (the attribute information, such as the file name), the file display information prepared in Step S105 and the current processing mode so as to correlate them with each other in the hard disk drive 15 with respect to each file obtained from the external memory connected to the connection terminal unit 27. The stored file display information is reused in case that the information of the file is displayed by the same display form.

The CPU 11 instructs the display unit 22 to display the information of each file (Step S107). In detail, the CPU 11 instructs the display unit 22 to display the file selection window including the list of the file information, which will be explained. In the file selection window, by using the file display information prepared in Step S105, the preview or the icon view is carried out for the file which can be processed in the current processing mode. Further, the simple view is carried out for the file which cannot be processed in the current processing mode. That is, when the file to be processed by the image processing apparatus 10 is selected among the stored files, the CPU 11 instructs the display unit 22 to display the information of the stored files.

When the file selection operation for selecting the file from the displayed list is received, and the setting finish operation (the operation of the setting finish button or the start button) for finishing the settings of the process contents and the like for the selected file is received (Step S108; Yes), this process is ended. Then, the image processing apparatus 10 carries out the process for the selected file in accordance with the selected processing mode.

When the setting finish operation is not received (Step S108; No), the CPU 11 checks whether the changing operation for changing the processing mode is received by the operating unit 21 of the image processing apparatus 10 from the user. When the changing operation for the processing mode is not received (Step S109; No), the process returns to Step S108 and continues. When the changing operation is received (Step S109; Yes), the CPU 11 changes the current processing mode to the processing mode which is designated in the changing operation (Step S110). Then, the process returns to Step S104 and continues. That is, when the changing operation for changing the processing mode is received, the CPU 11 checks whether each file can be processed in the changed processing mode and updates the indication of each file (the display form for the information of the file) in the file selection window according to whether the file can be processed or not in the changed processing mode.

Figure 4:
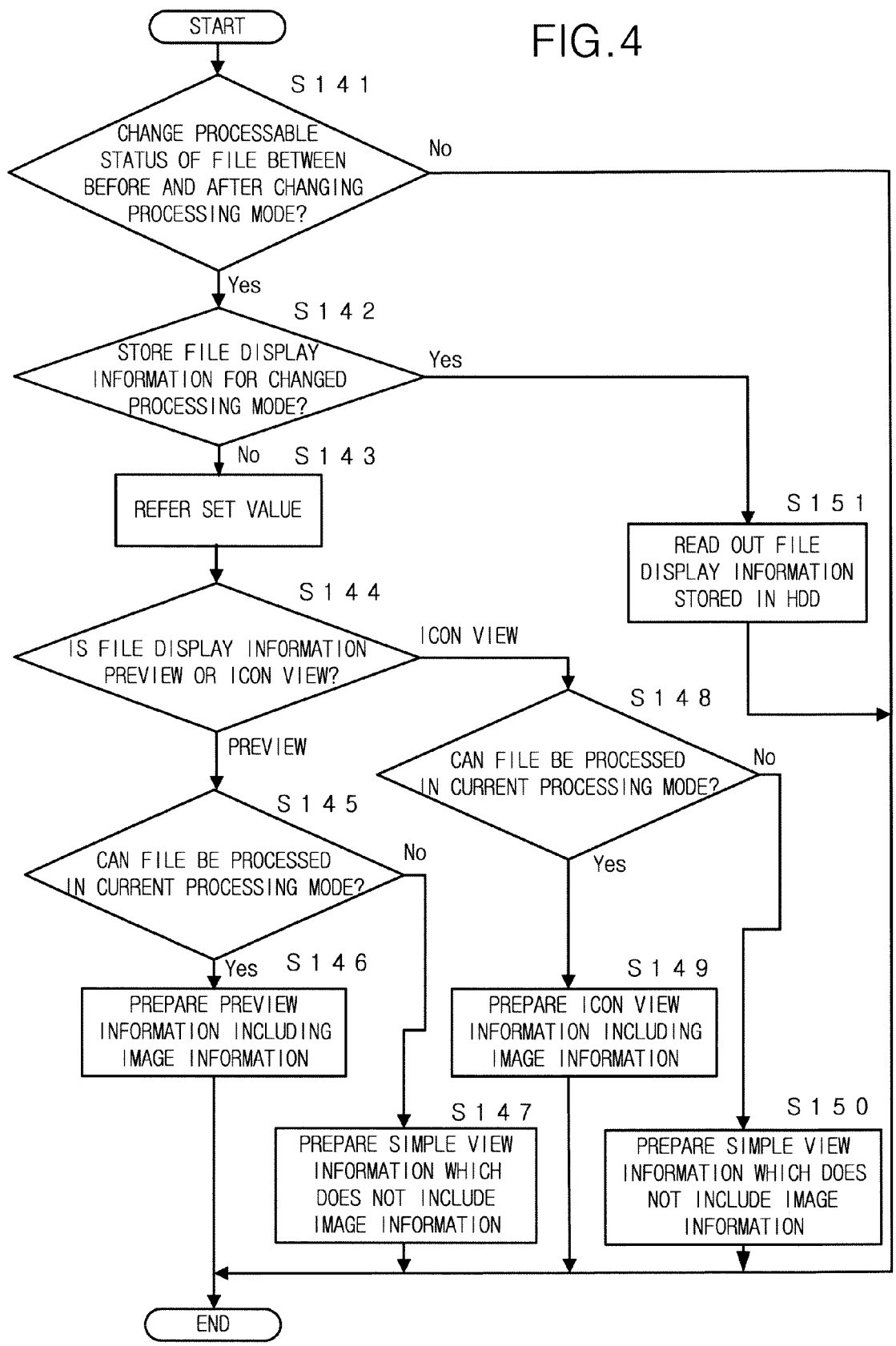
FIG. 4 is a flowchart showing the detail of Step S105 (file display information preparing process) shown in FIG. 3.

FIG. 4 shows the detail of Step S105 (file display information preparing process) shown in FIG. 3. This process is carried out for each file read out from the external memory connected to the connection terminal unit 27.

The CPU 11 checks whether the processable status of each file is changed between before and after changing the processing mode (Step S141). The processable status indicates whether the file can be processed or not. In case that this process is carried out initially after the external memory is connected, the process proceeds by assuming that in Step S141, the processable status of the file is changed between before and after changing the processing mode.

When the processable status of the file is not changed between before and after changing the processing mode (Step S141; No), the file display information stored in Step S106 before changing the processing mode can be used. Therefore, the process is ended without newly preparing the file display information for the preview, the icon view or the simple view. That is, in this case, the CPU 11 diverts the display information of the file, which is used for displaying the information of the file before changing the processing mode, in the changed processing mode.

When the processable status of the file is changed between before and after changing the processing mode (Step S141; Yes), the CPU 11 checks whether the file display information of the file, which is used in the changed processing mode, is already stored or not (Step S142). That is, the CPU 11 checks whether the above file display information is stored in Step S106. For example, in case that the file can be processed in the changed processing mode and the display form is set to the preview, the CPU 11 checks whether the file display information for the preview of the file is already stored.

In case that the file display information of the file, which is used in the changed processing mode, is already stored (Step S142; Yes), the CPU 11 reads out the file display information (Step S151). Then, the process is ended.

In case that the file display information of the file, which is used in the changed processing mode, is not yet stored (Step S142; No), the CPU 11 prepares the new file display information. In detail, the CPU 11 refers the default value for setting the display form to the preview or the icon view (Step S143), and judges the setting contents of the default value (Step S144). The default value is stored in the nonvolatile memory 14. However, the display form selection operation for selecting the preview or the icon view can be received from the user while the file information is displayed.

In case that the preview is set (Step S144; preview), the CPU 11 checks whether the file can be processed in the current processing mode (Step S145). When the file can be processed (Step S145; Yes), the CPU 11 prepares the file display information for the preview, which includes the image information of the file, such as the thumbnail images or the like (Step S146). Then, the process is ended.

When the file cannot be processed in the current processing mode (Step S145; No), the CPU 11 prepares the file display information for the simple view, which does not include the image information of the file (Step S147). Then, the process is ended.

In case that the icon view is set (Step S144; icon view), the CPU 11 checks whether the file can be processed in the current processing mode (Step S148). When the file can be processed (Step S148; Yes), the CPU 11 prepares the file display information for the icon view, which includes the image information of the file, such as the thumbnail images or the like (Step S149). Then, the process is ended.

When the file cannot be processed in the current processing mode (Step S148; No), the CPU 11 prepares the file display information for the simple view, which does not include the image information of the file (Step S150). Then, the process is ended.

In the file display information for the simple view, the information indicating the processable status in each processing mode is included.

Next, various types of the examples of the file selection window in which the list of the files stored in the storing device is displayed are explained.

Figure 5A:
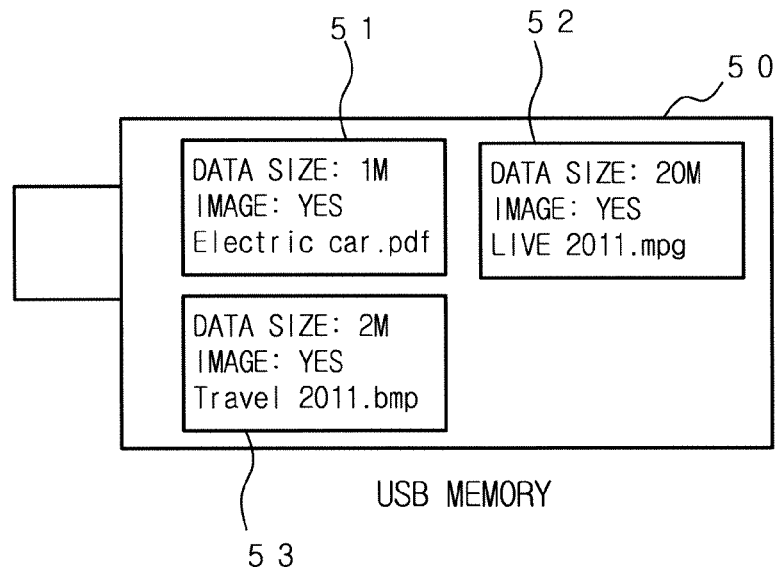
FIGS. 5A and 5B are explanatory views showing the USB memory connected to the connection terminal unit and the file selection window in which the information of the files stored in the USB memory is displayed and in which the current processing mode is the print mode.
Figure 5B:
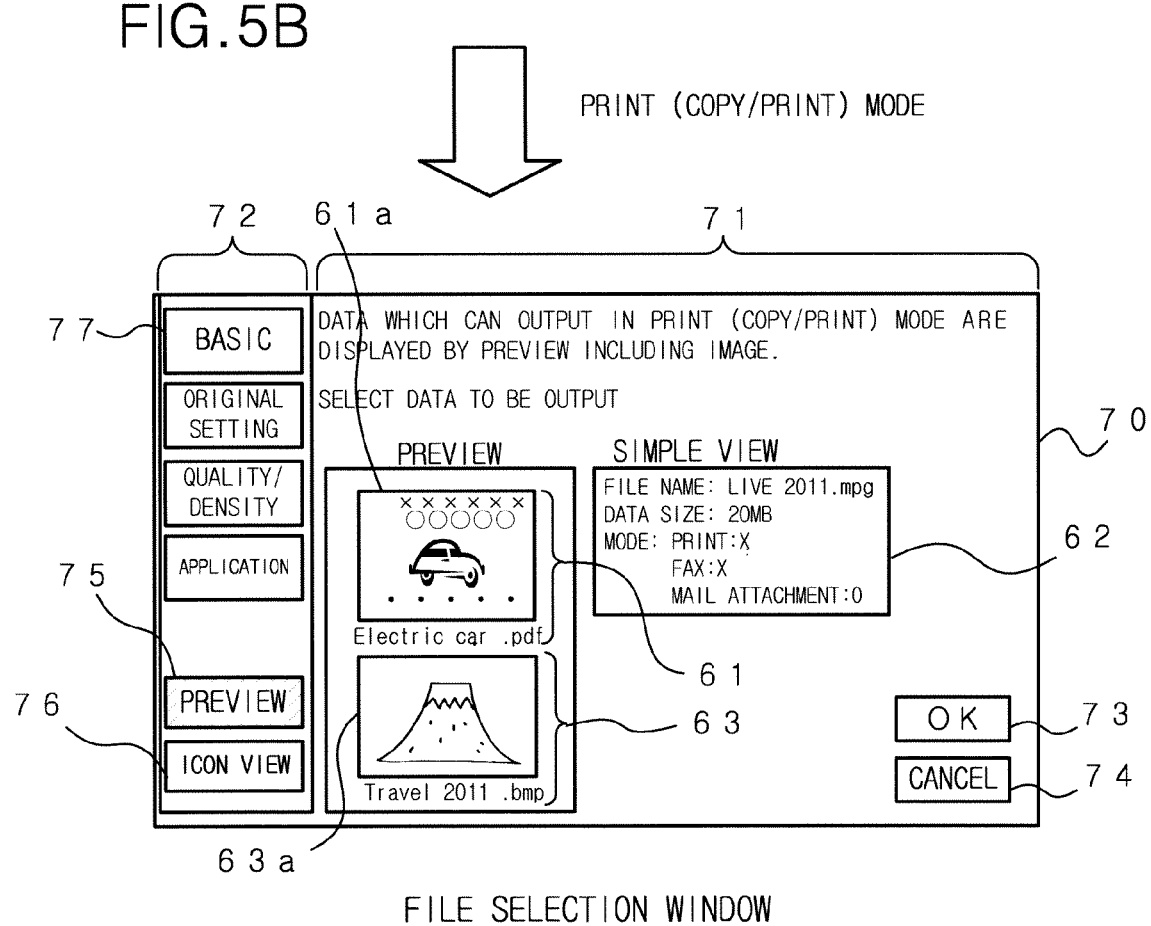

FIGS. 5A and 5B show the USB memory 50 connected to the connection terminal unit 27 and an example of the file selection window in which the information of the files stored in the USB memory 50 is displayed. In FIGS. 5A and 5B, the current processing mode is the print mode. FIG. 5A shows the files stored in the connected USB memory 50. In the USB memory 50 of FIG. 5A, the PDF format file 51, the MPEG format file 52 and the BMP format file 53 are stored one by one.

FIG. 5B shows the file selection window 70 in which the information of the files stored in the USB memory 50 of FIG. 5A is displayed in the state that the current processing mode is the print mode. In the file selection window 70, the file information display area 71 for displaying the information of the files and the change button area 72 for arranging the selection buttons for changing the window, are provided. In the upper portion of the file selection window 70, the message indicating the explanation and the operation guide relating to this window is displayed. On the lower side of the massage, the file information 61 to 63 of each file 51 to 53 stored in the USB memory 50 is displayed by the preview or the simple view. In detail, because the PDF format file 51 can be processed (can be output) in the print mode, the file information 61 having the preview form is displayed. Because the MPEG format file 52 cannot be processed (cannot be output) in the print mode, the file information 62 having the simple view form is displayed. Because the BMP format file 53 can be processed (can be output) in the print mode, the file information 63 having the preview form is displayed.

Each of the file information 61 and 63 displayed by the preview includes each thumbnail image 61a, 63a of the files and the file name of each file. Each of the thumbnail images 61a and 63a functions as the file selection button for selecting the file to be processed (to be output).

The file information 62 displayed by the simple view includes the character information which does not include the image information. The file information 62 having the simple view form does not function as the file selection button. In the file information 62 having the simple view form, the file name and the data size of the file are included. Further, the information indicating the processable status in the current processing mode and the processable statuses in the other processing modes is included. In case of the file information 62 having the simple view form shown in FIG. 5B, the symbols "X" of "print" and "FAX" indicate that the file cannot be processed in the print mode nor the facsimile mode. The symbol "O" of the mail attachment indicates that the mail attachment can be carried out. The mail attachment can be carried out in the scan mode, the Box transmission mode and the like. The processable status may be indicated by using the specific processing mode name.

In the file selection window 70, the OK button 73 for finally determining the selection of the file and the cancel button 74 for cancelling the selection of the file are provided. In the left lower part of the window, the preview button 75 for switching the display form for the file information to the preview and the icon view button 76 for switching the display form for the file information to the icon view, are provided. In FIG. 5B, the preview button 75 is selected. When the icon view button 76 is pushed, the display form is switched to the icon view.

Figure 6A:
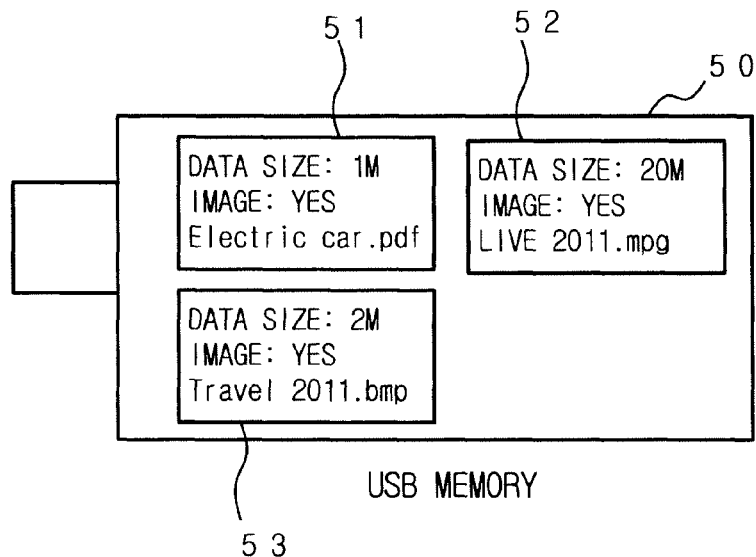
FIGS. 6A and 6B are explanatory views showing the USB memory and the file selection window incase that the processing mode is changed from the situation of FIG. 5B to the transmission (mail forwarding) mode.
Figure 6B:
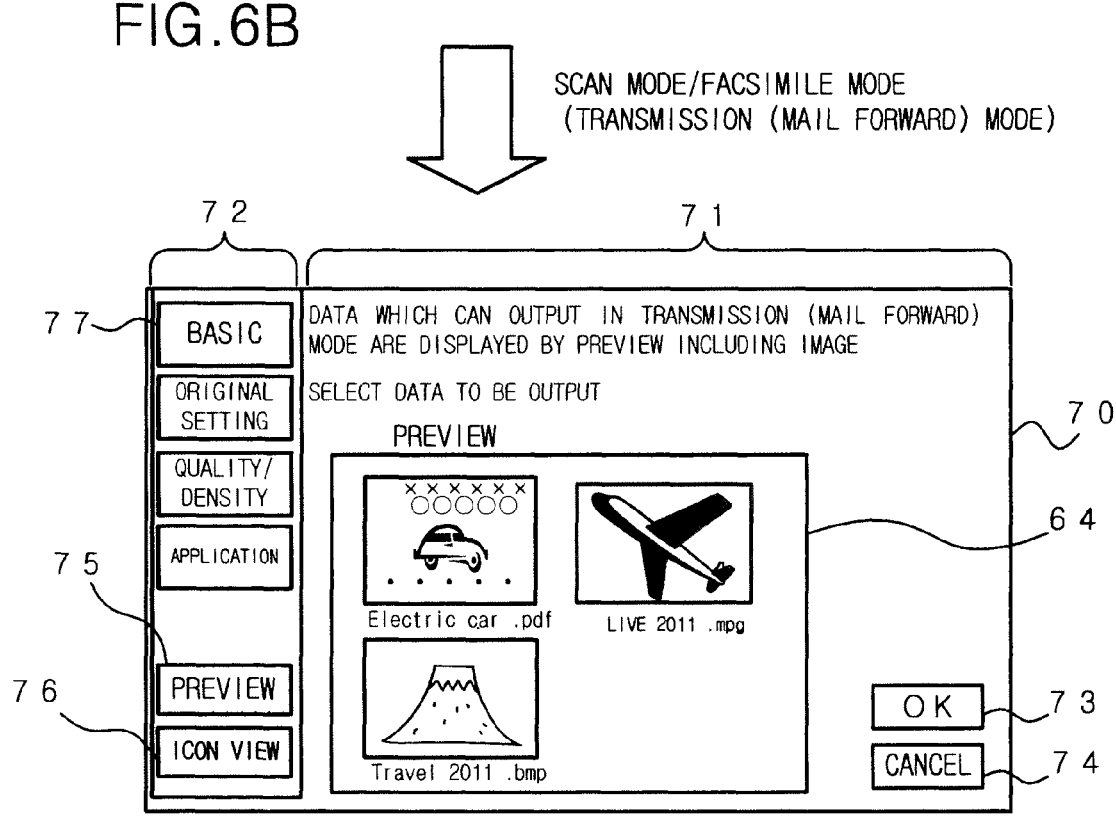

FIGS. 6A and 6B show the USB memory 50 and the file selection window 70 in case that the processing mode is changed from the situation of FIG. 5B to the transmission (mail forwarding) mode. The switching operation (the processing mode selection operation) for switching the processing mode is received by the processing mode selection button (not shown) provided in the operating unit 21. The USB memory 50 of FIG. 6A is the same as that of FIG. 5A. In the transmission mode, all of the PDF format file 51, the MPEG format file 52 and the BMP format file 53 can be processed. Therefore, the file information of these files is displayed by the preview. In detail, the file information 62 in the file selection window 70 of FIG. 5B is changed to the file information 64 displayed by the preview in the file selection window 70 of FIG. 6B.

As described above, when the processing mode is changed by operating the operating unit 21 by the user, the display form for the file information of each file in the file selection window 70 is changed according to the processable status of each file in the changed processing mode. Thereby, even though the processing mode is changed, the user can easily recognize the processable status of each file in the changed processing mode. Further, because the preview is widely different from the simple view in the display form, it is possible to easily and instantly recognize the processable status in the current processing mode.

In case of the file which cannot be processed in the current processing mode, the information relating to the processable statuses in the other processing modes is displayed. Therefore, it is possible to quickly switch to the processing mode in which the file can be processed. That is, because it is possible to recognize the processable statuses in the other processing modes before switching the processing mode, it is not necessary to confirm the processable status in each processing mode by switching the processing mode in order. Further, the user can directly change the processing mode to the processing mode in which the file can be processed.

Figure 7:
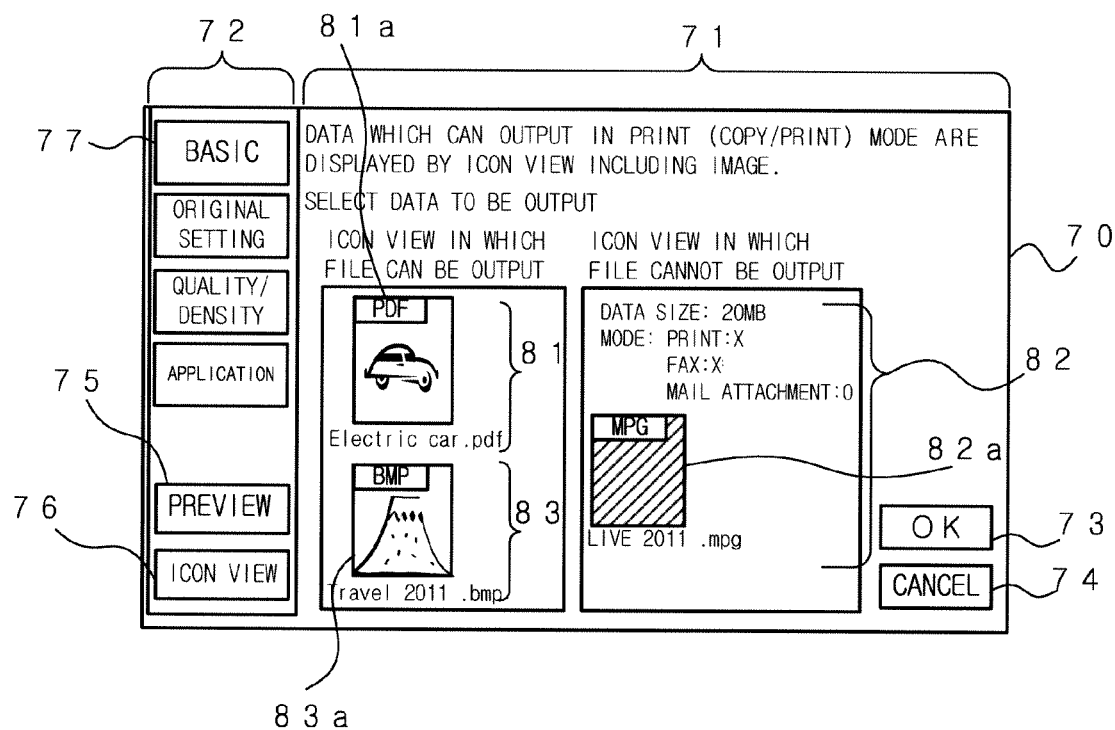
FIG. 7 is an explanatory view showing an example of the file selection window in case that the file information is displayed by the icon view.

FIG. 7 shows an example of the file selection window 80 in case that the file information is displayed by the icon view. When the icon view button 76 is pushed in the file selection window 70 of FIG. 5B, the window is changed to the file selection window 80 of FIG. 7. In the file selection window 80 of FIG. 7, the icon view button 76 is selected. The parts of the file selection window 80, which are the same as those of the file selection window 70 in FIG. 5B are denoted by the same reference numerals and the explanation thereof is omitted.

In FIG. 7, the information of the files stored in the USB memory 50 of FIG. 5A is displayed. Because the PDF format file 51 stored in the USB memory 50 of FIG. 5A can be processed (can be output) in the print mode, the file information 81 having the icon view form is displayed. Because the MPEG format file 52 cannot be processed (cannot be output) in the print mode, the file information 82 having the simple view form is displayed. Because the BMP format file 53 can be processed (can be output) in the print mode, the file information 83 having the icon view form is displayed.

Each of the file information 81 and 83 having the icon view form includes the icon 81a, 83a and the file name of each file. Each of the icons 81a and 83a functions as the file selection button for selecting the file to be processed (to be output). Further, in the icons 81a and 83a, the file format (the extension of the file) is displayed by the characters.

In the embodiment, the file information 82 having the simple view form is displayed by using the icon. In detail, the icon 82a which does not include the image information is displayed with the file name and the data size. Further, like the file information 62 displayed by the simple view in FIG. 5B, the information indicating the processable status in the current processing mode and the processable statuses in the other processing modes is included. The file information 82 having the simple view form and the icon 82a do not function as the file selection button.

Next, the window change from the basic setting window will be explained.

Figure 8:
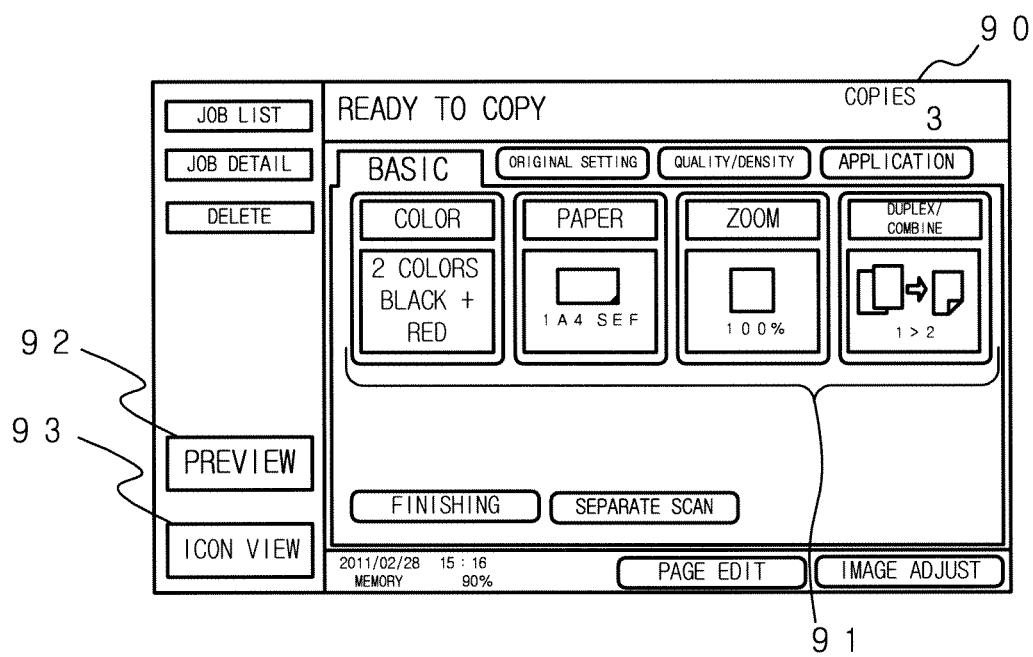
FIG. 8 is an explanatory view showing an example of the setting window for carrying out the basic settings of the print mode (copy mode)

FIG. 8 shows the basic setting window 90 for the print mode (copy mode). In FIG. 8, the tag for the basic setting is selected. In the basic setting window 90 shown in FIG. 8, the item selection buttons 91 for setting the setting item relating to the color print, the setting item relating to the paper, the setting item relating to the zoom and the setting item relating to the duplex/combine, are displayed. In the left lower portion of the basic setting window 90, the preview button 92 and the icon view button 93 are displayed. The image processing apparatus 10 instructs the display unit 22 to display the basic setting window 90 of FIG. 8 in the standby state in which the job is not executed.

When the preview button 92 is pushed in the basic setting window 90 of FIG. 8, the CPU 11 of the image processing apparatus 10 changes the window to the file selection window 70 shown in FIG. 5B. Then, when the copy mode basic setting button 77 is pushed in the file selection window 70 of FIG. 5B, the CPU 11 returns the window to the basic setting window 90 of FIG. 8. Further, when the icon view button 93 is pushed in the basic setting window 90 of FIG. 8, the CPU 11 changes the window to the file selection window 80 shown in FIG. 7. Then, when the copy mode basic setting button 77 is pushed in the file selection window 80 of FIG. 7, the CPU 11 returns the window to the basic setting window 90 of FIG. 8.

Further, when the icon view button 76 is pushed in the file selection window 70 of FIG. 5, the CPU 11 changes the window to the file selection window 80 of FIG. 7. When the preview button 75 is pushed in the file selection window 80 of FIG. 7, the CPU 11 changes the window to the file selection window 70 of FIG. 5B.

Next, the combined setting window in which the setting area relating to the basic setting and the like and the file information display area for displaying the information of the files are provided in one window, will be explained.

Figure 9:
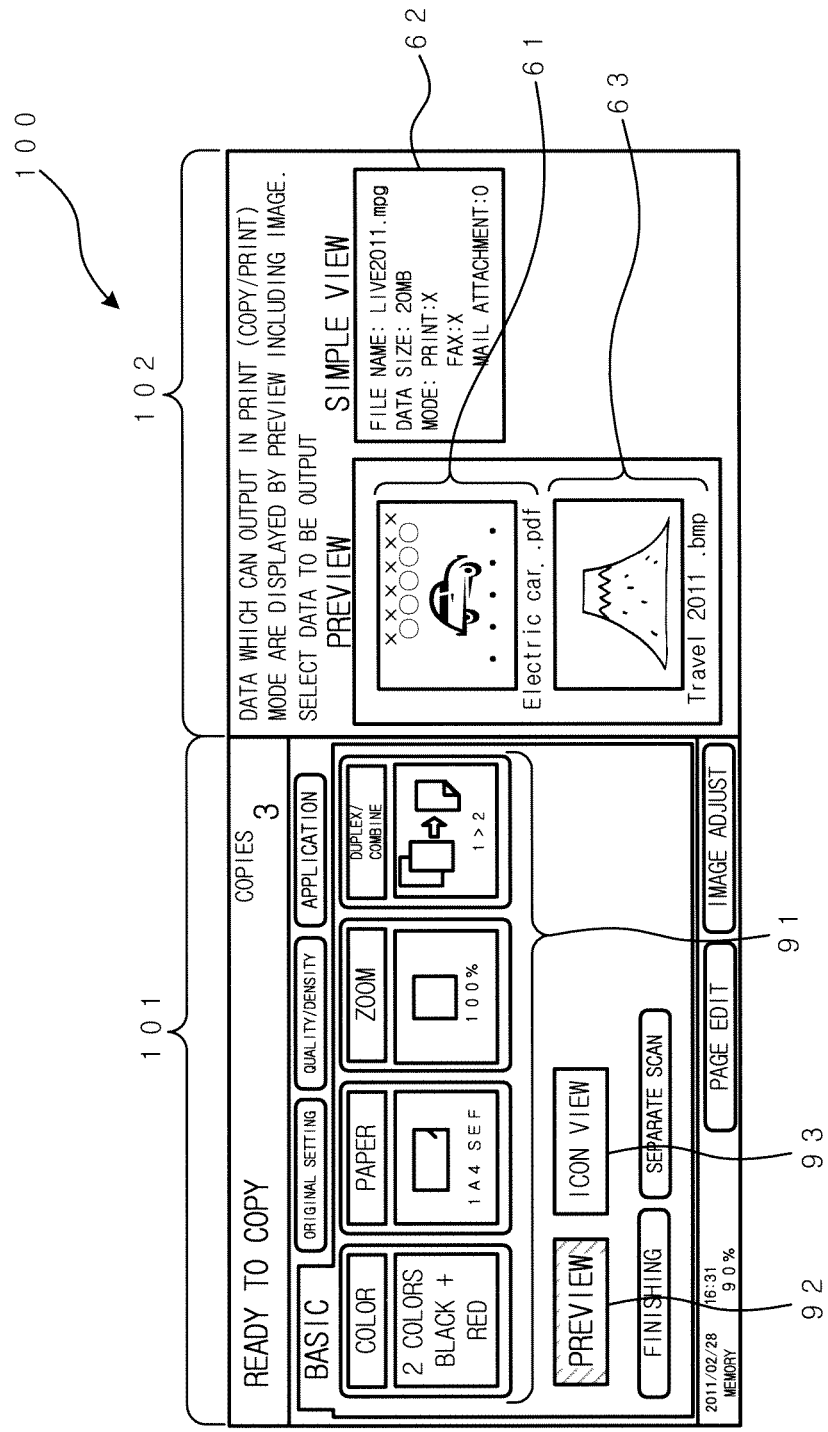
FIG. 9 is an explanatory view showing an example of the combined setting window in case that the file information is displayed by the preview.

FIG. 9 shows an example of the combined setting window 100. The left half part of the combined setting window 100 is the setting area 101 relating to the basic setting and the right half part thereof is the file information display area 102. In the setting area 101, the item selection buttons 91 for setting the setting item relating to the color print, the setting item relating to the paper, the setting item relating to the zoom and the setting item relating to the duplex/combine, are displayed like the basic setting window 90 of FIG. 8. On the lower side of the item selection buttons 91, the preview button 92 and the icon view button 93 are arranged. In the setting area 101, the parts which are the same as those of the basic setting window 90 of FIG. 8 are denoted by the same reference numerals. Further, in the file information display area 102, the parts which are the same as those of the file information window 70 of FIG. 5B are denoted by the same reference numerals. The display contents of the file information area 102 are the same as those of the file information display area 71 of the file selection window 70 in FIG. 5B.

Figure 10:
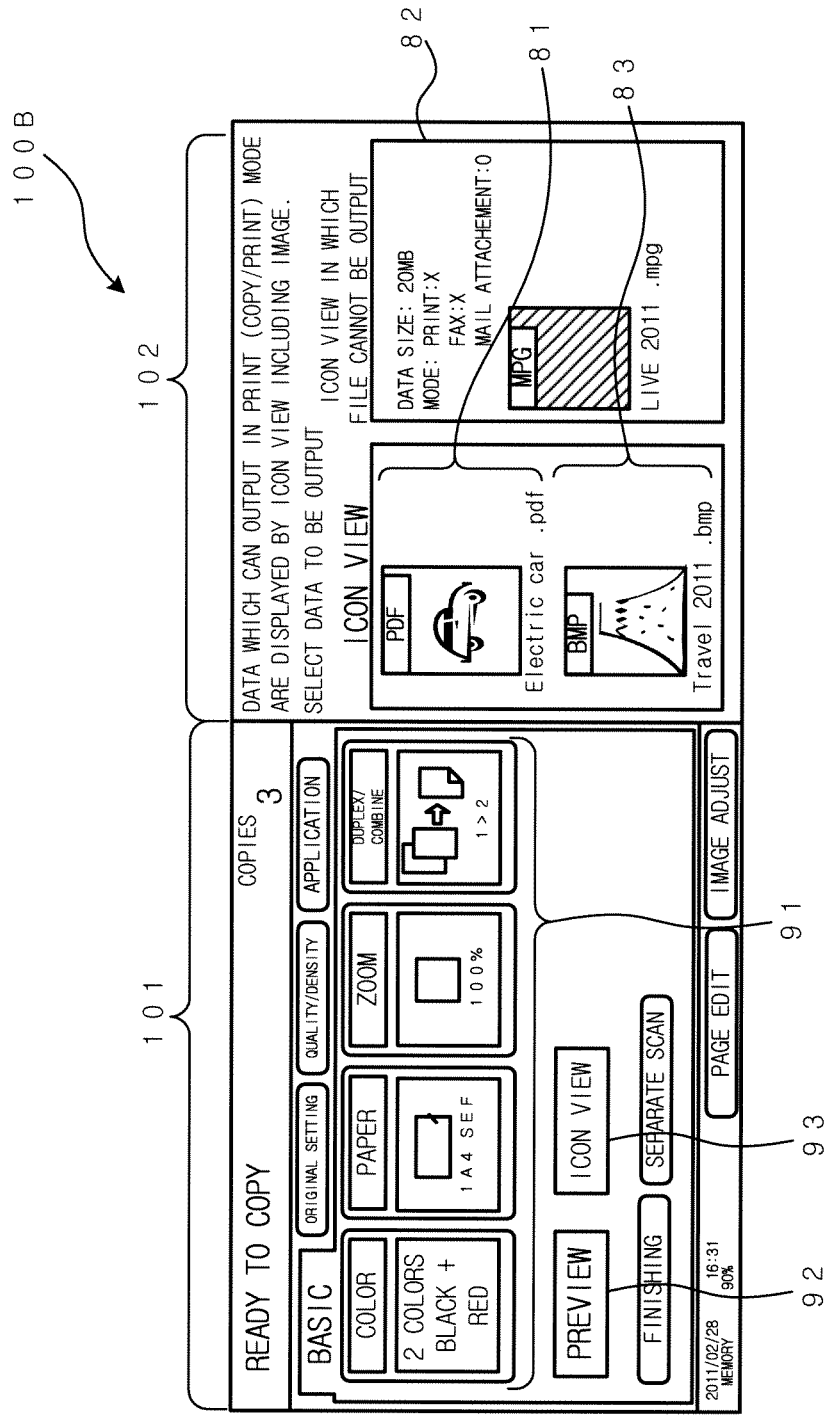
FIG. 10 is an explanatory view showing an example of the combined setting window in case that the file information is displayed by the icon view.

In the combined setting window 100 of FIG. 9, the preview button 92 is selected. In the file information display area 102, each of the file information 61 and 63 are displayed by the preview and the file information 62 is displayed by the simple similarly to FIG. 5B. When icon view button 93 is pushed in the combined setting window 100, the CPU 11 instructs the display unit 22 to display the combined setting window 100B shown in FIG. 10. The display contents of the file information display area 102 in the combined setting window 100B are the same as those of the file information display area 71 in the file selection window 80 of FIG. 7. In the file information display area 102, each of the file information 81 to 83 is displayed by using the icons. When the preview button 92 is pushed in the combined setting window 100B of FIG. 10, the combined setting window 100 shown in FIG. 9 is displayed.

Second Embodiment

Next, the second embodiment of the present invention will be explained.

In the second embodiment, in case that the information of the file which cannot be processed in the current processing mode is displayed by the simple view, if there is another processing mode in which the above file can be processed, the operation button for changing the processing mode to another processing mode in which the above file can be processed is displayed as a part of the simple view.

Figure 11:
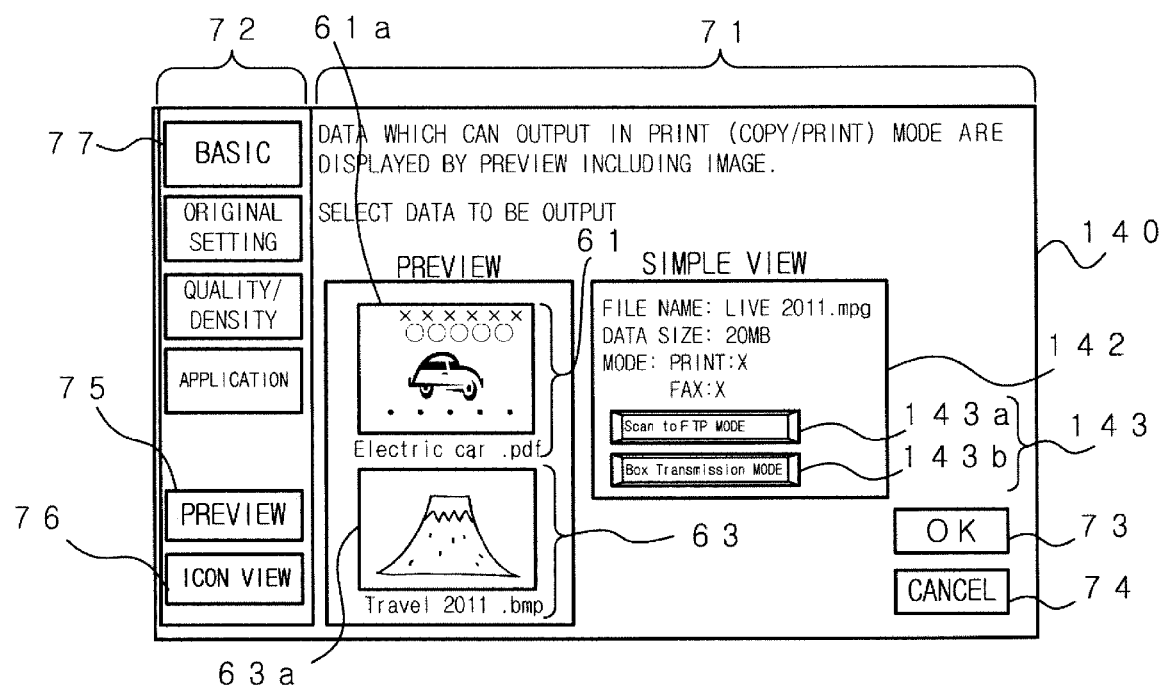
FIG. 11 an explanatory view showing an example of the file selection window (in which the processing mode changing button is displayed in a simple view) which is displayed by the image processing apparatus according to the second embodiment.

FIG. 11 shows an example of the file selection window 140 displayed by the image processing apparatus 10 according to the second embodiment. The parts of the file selection window 140, which are the same as those of the file selection window 70 of FIG. 5B are denoted by the same reference numerals and the explanation thereof is omitted. In the file selection window 140 of FIG. 11, the information of the files stored in the USB memory 50 of FIG. 5A is displayed. The current processing mode is the print mode.

In the file selection window 140, the processing mode changing buttons (processing mode switching buttons) 143 for changing the processing mode to another processing mode in which the MPEG format file 52 can be processed are displayed in the file information 142 of the MPEG format file 52, which is displayed by the simple view. In detail, in the file information 142 displayed by the simple view, the indication relating to the file name and the data size of the file, the indication (PRINT: X) that the file 52 cannot be processed in the current processing mode, the indication (FAX: X) of another processing mode in which the file 52 cannot be processed, and the processing mode changing buttons 143 indicating other processing modes in which the file 52 can be processed, are included. In the example of FIG. 11, the processing mode changing button 143a for the Scan To FTP mode and the processing mode changing button 143b for the Box transmission mode are displayed.

When any one of the processing mode changing buttons 143 is pushed by the user, the CPU 11 changes the processing mode in accordance with the pushed processing mode changing button 143. Further, the file information of each file is updated in accordance with the processable status in the changed processing mode.

For example, in the file selection window 140 of FIG. 11, when the processing mode changing button 143a for the Scan To FTP mode is operated, the file selection window 70 of FIG. 6B is displayed. Then, the display form of the file information 142 of FIG. 11 is changed to that of the file information 64 as shown in FIG. 6B.

Figure 12:
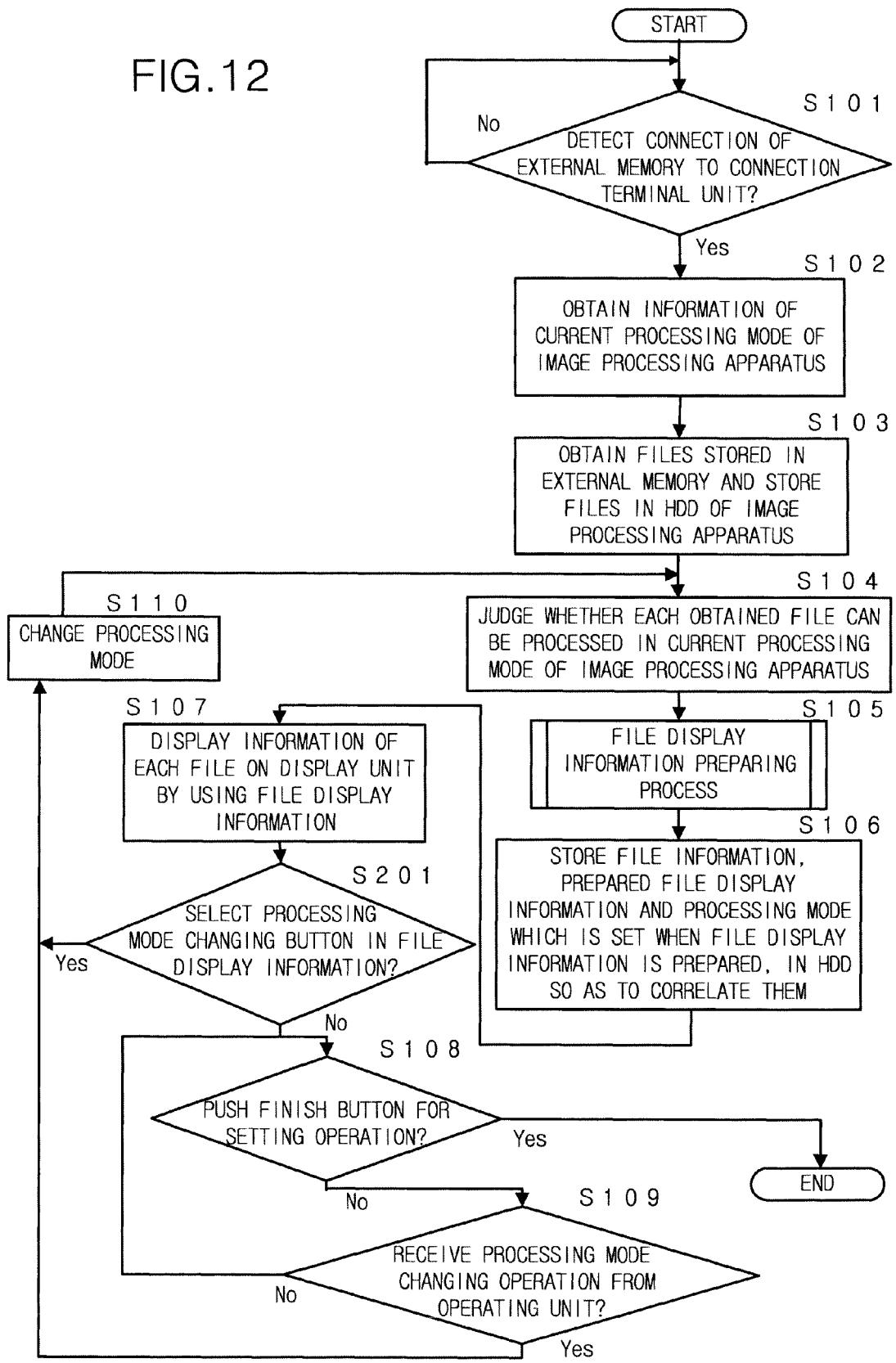
FIG. 12 is a flowchart showing the operation which is carried out when the CPU of the image processing apparatus according to the second embodiment instructs the display unit to display the list of flies stored in the external memory connected to the connection terminal unit.

FIG. 12 shows the operation which is carried out when the CPU 11 of the image processing apparatus 10 according to the second embodiment instructs the display unit 22 to display the list of the files stored in the external memory connected to the connection terminal unit 27. In this embodiment, before the external memory is connected to the connection terminal unit 27, one processing mode is selected by the user.

In the process of FIG. 12, Step S201 is added to the flowchart shown in FIG. 3 between Step S107 and Step S108. The other steps are the same as those of FIG. 3. The steps which are the same as those of FIG. 3 are denoted by the same step numbers and the explanation thereof is omitted. In Step S201, the CPU 11 checks whether the processing mode changing button 143 included in the file information having the simple view form is operated or not. When the processing mode changing button 143 is operated (Step S201; Yes), the process proceeds to Step S110. The CPU 11 changes the current processing mode to the processing mode corresponding to the pushed processing mode changing button 143. When the processing mode changing button 143 is not operated (Step S201; No), the process proceeds to Step S108.

Incase that the processing mode changing buttons 143 are displayed, the file display information including the processing mode changing buttons 143 is prepared as follows. When the file display information having the simple view form is prepared in the file display information preparing process of FIG. 4, if the file can be processed in another processing mode, the file display information including the processing mode changing button 143 for changing the processing mode to another processing mode in which the file can be processed is prepared.

Next, an example of the system in which the file information display function for receiving the file selection operation by instructing the display unit to display the list of the files stored in the external memory or the like, is carried out by a device which is separated from the image processing apparatus 10, will be explained.

Figure 13:
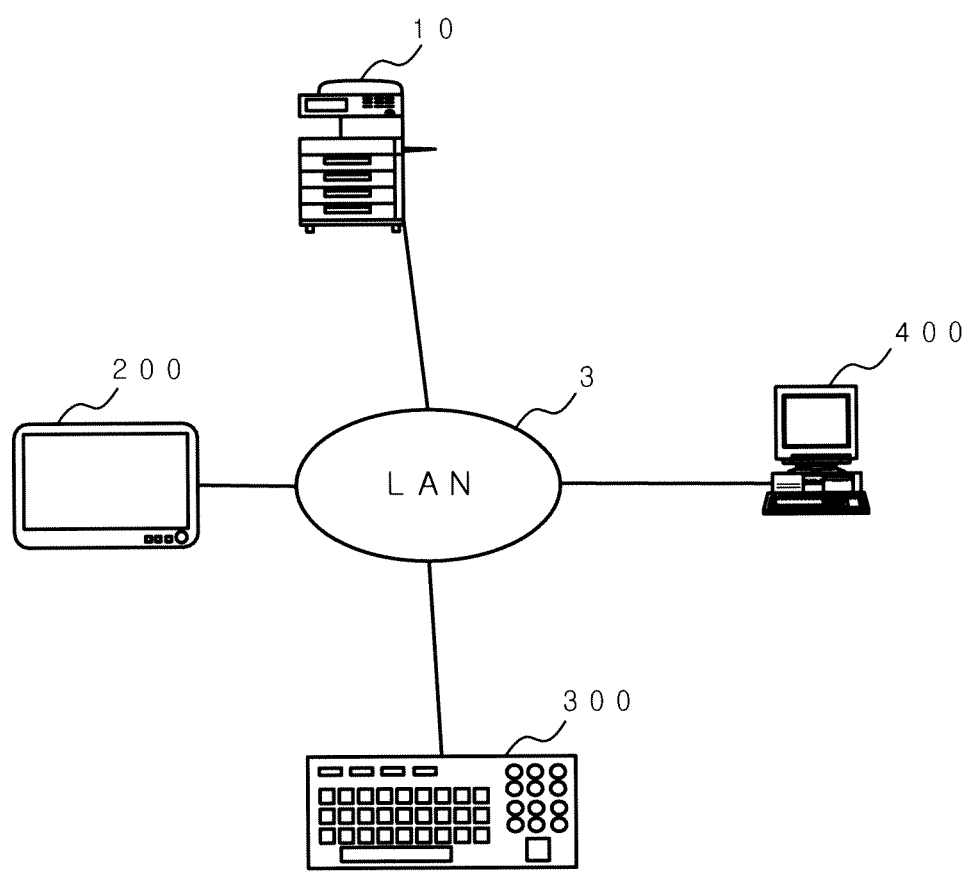
FIG. 13 shows an example of the system configuration which comprises various types of devices according to the embodiments.

FIG. 13 shows an example of the system configuration in case that the file information display function is carried out by a device which is different from the image processing apparatus 10. In the system, the image processing apparatus 10, the operation display device 200, the display control device 300 and the information processing device 400 are connected to each other via the communication path 3, such as a LAN (Local Area Network).

Third Embodiment

Figure 14:
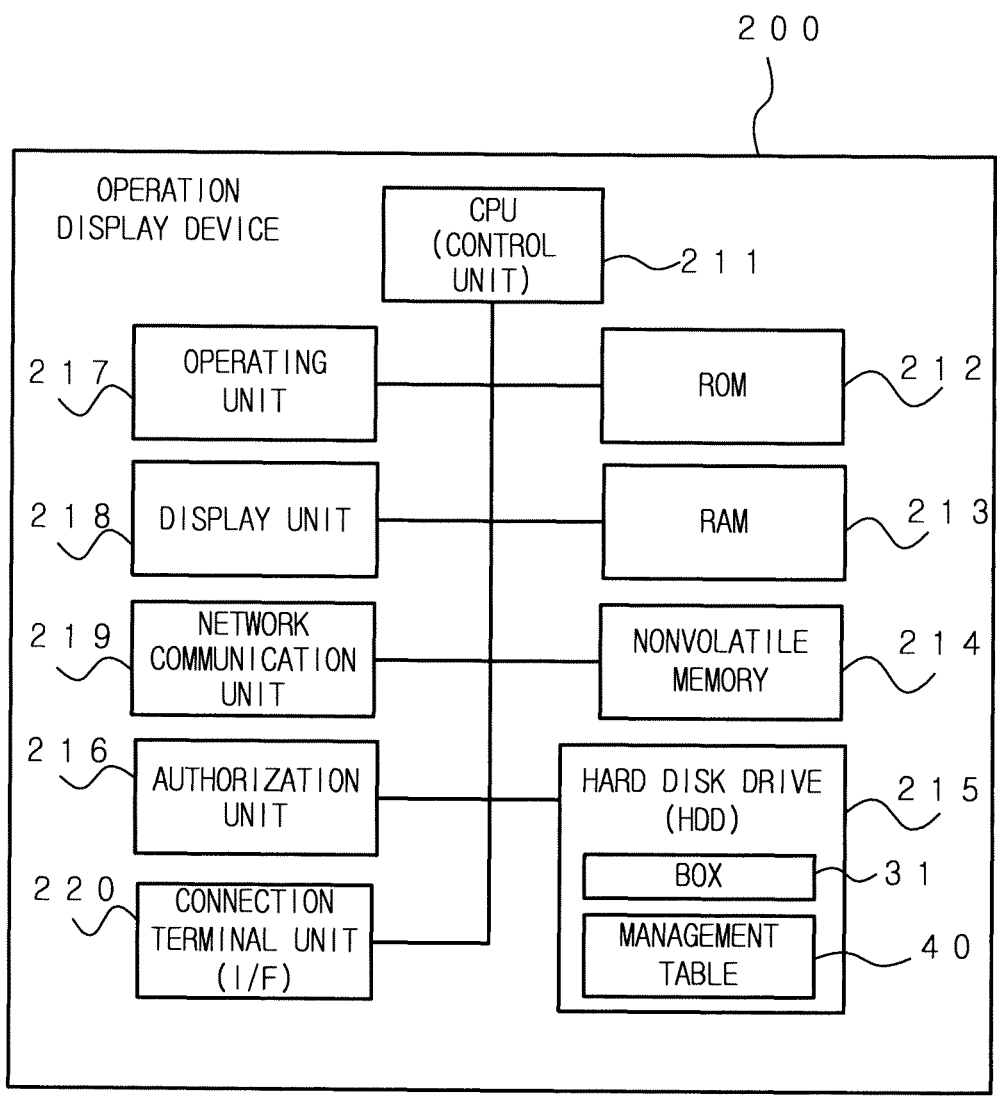
FIG. 14 is a block diagram showing a schematic configuration of the operation display device according to the third embodiment.

The case in which the operation display device 200 serves as the file information display function is explained. FIG. 14 shows the schematic configuration of the operation display device 200. The operation display device 200 has a function as a remote control terminal for remotely controlling the image processing apparatus 10. The operation display device 200 has a function to receive the setting operation for jobs which are executed by the image processing apparatus 10 and to transmit the instruction for executing the set jobs to the image processing apparatus 10, and the like. When the jobs are set, the operation display device 200 serves as the file information display function for instructing the display unit 218 to display the list of the files stored in the storing device which is selected among the external memory connected to the operation display device 200, the storing device provided in the operation display device 200, the hard disk drive 15 of the image processing apparatus 10, a server installed on the network and the like, and for receiving the file selection operation for selecting the file to be processed by the image processing apparatus 10 from the above list.

The operation display device 200 comprises a CPU 211 as a control unit for wholly controlling the operation of the operation display device 200. The CPU 211 is connected to a ROM 212, a RAM 213, a nonvolatile memory 214, a hard disk drive (HDD) 215, an authorization unit 216, an operating unit 217, a display unit 218, a network communication unit 219 and a connection terminal unit 220 via a bus.

In the ROM 212, various types of programs are stored. By executing the processes by the CPU 211 in accordance with these programs, the functions of the operation display device 200 are realized.

The RAM 213 is used as a work memory for temporarily storing various data when the CPU 211 carries out the process in accordance with the programs and as an image memory for storing image data.

The nonvolatile memory 214 is a memory (flash memory) in which the stored contents are not damaged even if the operation display device 200 is turned off, and is used for storing various setting information and the like.

The hard disk drive 215 is a large-capacity nonvolatile memory device. In the hard disk drive 215, files, such as print data, image data and the like, are stored. Further, in the hard disk drive 215, boxes 31 which are the same as those of the image processing apparatus 10 are prepared. In the hard disk drive 215, the management table 40 which is the same as that of the image processing apparatus 10, is stored.

The authorization unit 216 has a function to authorize a user which uses the operation display device 200. The authorization unit 216 carries out the user authorization by checking the input user ID (Identification) and the input password by using the authorization information which is previously registered. The authorization method is not limited to this.

The display unit 218 is configured by a liquid crystal display or the like, and displays various types of windows, such as a standby window, an operation window, a file selection window, a setting window and the like. The operating unit 217 receives various types of operations, such as the input of the jobs from the user, the selection of the processing mode, the selection of the file to be processed, and the like. The operating unit 217 comprises a touch panel which is provided on the screen of the display unit 218. The touch panel detects a coordinate position in which the user pushes down. Further, the operating unit 217 comprises a numerical keypad, an alphabetical keypad, and the like. A software keyboard can be used as the above operation keypad.

The network communication unit 219 has a function to transmit and receive the data to/from the image processing apparatus 10, an external device or a server via the communication path 3, such as a LAN (Local Area Network). In this case, in addition to a wire communication, a wireless communication can be also used.

The communication terminal unit 220 is the same as the communication terminal unit 27 of the image processing apparatus 10, and is an interface unit for detachably connecting a storing memory which is an external device, such as a portable recording medium (external memory).

When the operation display device 200 instructs the display unit 218 to display the list of the files stored in the external memory connected to the connection terminal unit 220 or the hard disk drive 215 and receives the file selection operation for selecting the file to be processed by the image processing apparatus 10, the operation display device 200 carries out the process shown in FIG. 3 (or FIG. 12) and FIG. 4. Further, the display contents of the file information are the same as those of the first and the second embodiments and the explanation thereof is omitted.

In case that the start button is pushed in Step S108 of FIG. 3, the operation display device 200 transmits the information of the set jobs (including the execution request) and the selected file to be processed, to the image processing apparatus 10. The image processing apparatus 10 which receives the jobs and the file executes the jobs.

The operation display device 200 can be configured as an operation panel which is detachably connected to the image processing apparatus 10. Further, the function of the operation display device 200 may be realized by executing the predetermined program at a general-purpose portable terminal device.

Fourth Embodiment

Figure 15:
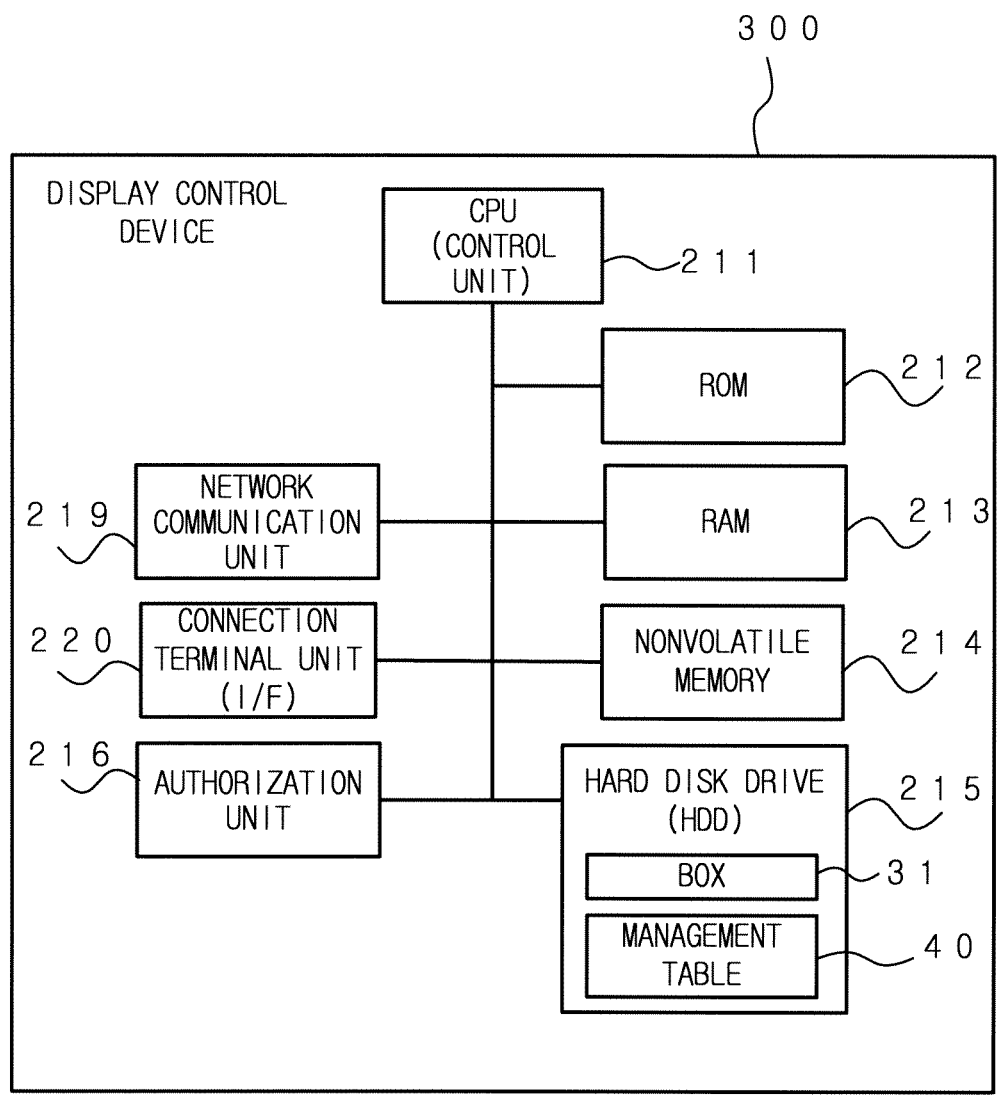
FIG. 15 is a block diagram showing a schematic configuration of the display control device according to the fourth embodiment.

In the fourth embodiment, the display control device 300 serves as the file information display function. FIG. 15 shows the schematic configuration of the display control device 300. The display control device 300 has the same configuration as the operation display device 200 except that the display control device 300 does not comprise the operating unit 217 and the display unit 218. The same parts are denoted by the same reference numerals. In the operation display device 200, the operating unit 217 of the operation display device 200 receives various types of operations and the display unit 218 is instructed to display the information of the files and the like. On the other hand, in case of the display control device 300, the operating unit and the display unit are provided outside of the display control device 300 and are connected to the display control device 300 so as to communicate with each other. For example, an external terminal device (external device) having the operating unit and the display unit are used by connecting to the display control device 300 via the communication path 3.

The display control device 300 receives the information relating to the operation contents received by the operating unit of the external terminal device, from the external terminal device and prepares the display data of the file selection window and the like in accordance with the operation contents. Further, the display control device 300 instructs the display unit of the external terminal device to display the file selection window and the like by transmitting the display data to the external terminal device.

In detail, in case that the operating unit of the external terminal device receives the file selection operation for selecting the file to be processed by the image processing apparatus 10, the display control device 300 instructs the display unit of the eternal terminal device to display the list of the files and the like stored in the external memory (external device) connected to the display control device 300, the hard disk drive 215 provided in the display control device 300 or the like. At this time, the display control device 300 carries out the process shown in FIG. 3 (or FIG. 12) and FIG. 4. Further, the display contents of the file information are the same as those of the first and the second embodiments and the explanation thereof is omitted.

Fifth Embodiment

Figure 16:
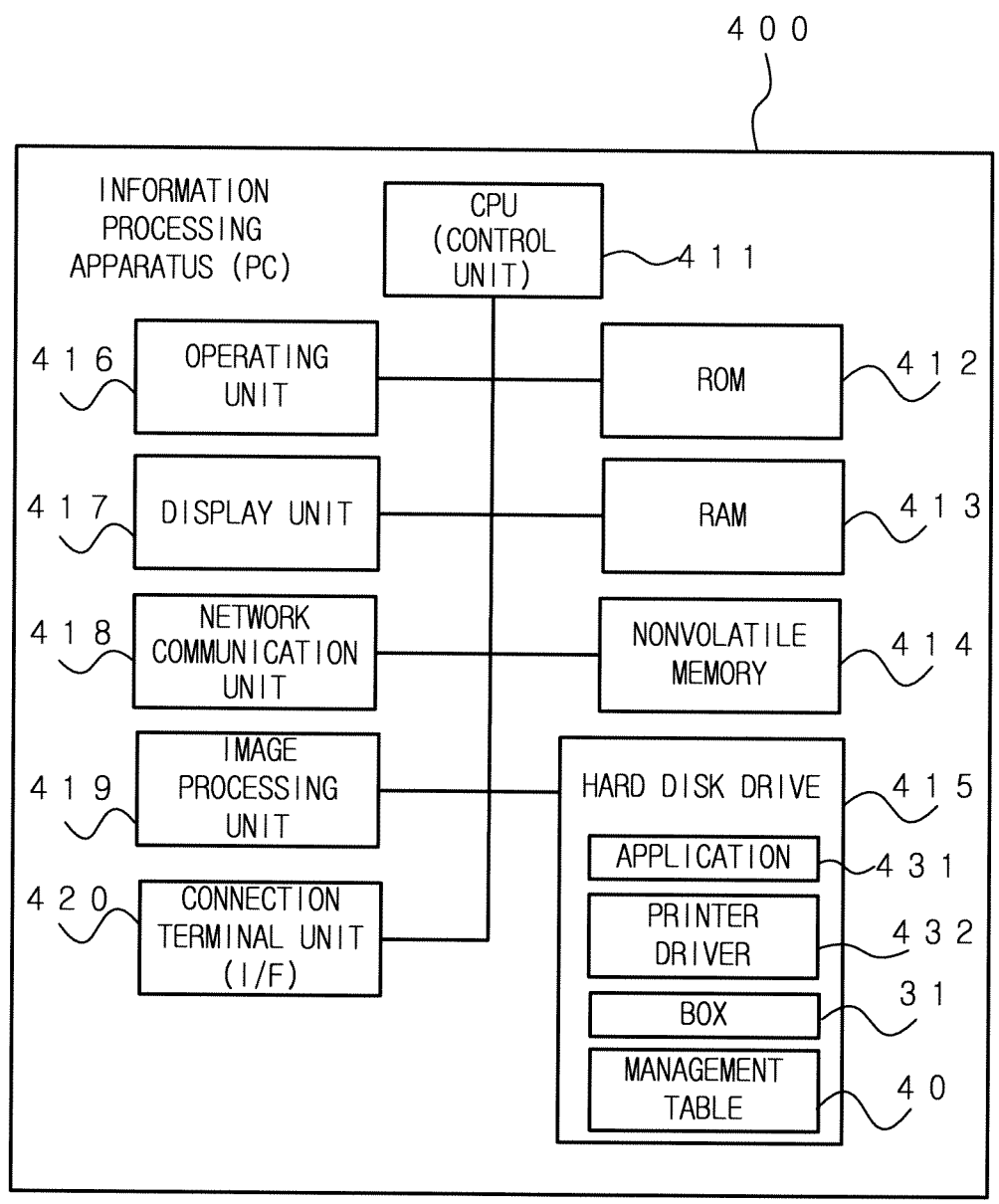
FIG. 16 is a block diagram showing a schematic configuration of the image processing apparatus according to the fifth embodiment.

In the fifth embodiment, the information processing apparatus 400 serves as the file information display function. FIG. 16 shows the schematic configuration of the information processing apparatus 400.

The information processing apparatus 400 has a function for transmitting the jobs, such as the print job, to the image processing apparatus 10 and a function as a remote control terminal for remotely controlling the image processing apparatus 10. The function as the remote control terminal is the same as that of the operation display device 200.

The information processing apparatus 400 has a function for receiving the setting operation of the jobs to be executed by the image processing apparatus 10 and for transmitting the instruction for executing the set jobs to the image processing apparatus 10. When the jobs are set, the information processing apparatus 400 serves as the file information display function for instructing the display unit 417 to display the list of the files stored in the storing device which is selected among the external memory connected to the information processing apparatus 400, the hard disk drive 415 provided in the information processing apparatus 400, the hard disk drive 15 of the image processing apparatus 10 and a server installed on the network, and for selecting the file to be processed by the image processing apparatus 10 from the above list.

The information processing apparatus 400 comprises a CPU 411 as a control unit for wholly controlling the operation of the information processing apparatus 400. The CPU 411 is connected to a ROM 412, a RAM 413, a nonvolatile memory 414, a hard disk drive (HDD) 415, an operating unit 416, a display unit 417, a network communication unit 418, an image processing unit 419 and a connection terminal unit 420 via a bus.

By the CPU 411, a middleware, application programs and the like are executed on an OS program as a base.

In the ROM 412, various types of programs are stored. By executing the processes by the CPU 411 in accordance with these programs, the functions of the information processing apparatus 400 are realized.

The RAM 413 is used as a work memory for temporarily storing various data when the CPU 411 carries out the process in accordance with the programs and as an image memory for storing image data.

The nonvolatile memory 414 is a memory (flash memory) in which the stored contents are not damaged even if the information processing apparatus 400 is turned off, and is used for storing various setting information and the like.

The hard disk drive 415 is a large-capacity nonvolatile memory device. In the hard disk drive 415, files, such as print data, image data and the like, are stored. Further, in the hard disk drive 415, boxes 31 which are the same as those of the image processing apparatus 10 are prepared. In the hard disk drive 415, the management table 40 which is the same as that of the image processing apparatus 10, is stored. Further, in the hard disk drive 415, various types of application programs 431 to be executed by the CPU 411 and the driver program 432 corresponding to the image processing apparatus 10 are stored. In the information processing apparatus 400, the following process is carried out. In the information processing apparatus 400, documents are prepared by the predetermined application program 431. The information processing apparatus 400 requests the image processing apparatus 10 to print the prepared documents.

The display unit 417 is configured by a liquid crystal display or the like, and displays various types of windows, such as a standby window, an operation window, a file selection window, a setting window and the like. The operating unit 416 receives various types of operations, such as the input of the jobs from the user, the selection of the processing mode, the selection of the file to be processed, and the like. The operating unit 416 comprises a touch panel which is provided on the screen of the display unit 417. The touch panel detects a coordinate position in which the user pushes down. Further, the operating unit 416 comprises a numerical keypad, an alphabetical keypad, a start key, a mouse as a pointing device and the like.

The network communication unit 418 has a function to transmit and receive the data to/from the image processing apparatus 10, an external device or a server via the communication path 3, such as a LAN (Local Area Network).

The image processing unit 419 carries out the process for preparing thumbnail images, in addition to the processings, such as enlargement/reduction and rotation of the image.

The communication terminal unit 420 is the same as the communication terminal unit 27 of the image processing apparatus 10, and is an interface unit for detachably connecting a storing memory which is an external device, such as a portable recording medium (external memory).

When the information processing apparatus 400 instructs the display unit 417 to display the list of the files stored in the external memory connected to the connection terminal unit 420 or the like and receives the file selection operation for selecting the file to be processed by the image processing apparatus 10, the information processing apparatus 400 carries out the process shown in FIG. 3 (or FIG. 12) and FIG. 4. Further, the display contents of the file information are the same as those of the first and the second embodiments.

The function of the information processing apparatus 400 may be realized by executing the predetermined program at a general-purpose information processing apparatus.

In any one of the third to the fifth embodiments, the operation display device 200, the display control device 300 and the information processing apparatus 400 carry out the same operations as the image processing apparatus 10 shown in the first and the second embodiments, and have the same function as the image processing apparatus 10. Therefore, it is possible to obtain the same effect.

In the operation display device 200, the display control device 300 and the information processing apparatus 400, in case that the files to be displayed are the files stored in the hard disk drive 15 of the image processing apparatus 10 or another external device, such as a server installed on the network, it is possible to carry out the process by receiving each file from another external devices or the like in Step S103 of FIG. 3 to store the files in own hard disk drive. However, in this method, the time for receiving the files is required. For example, the above devices request the external device which stores the files to prepare the thumbnail images of the files and receive the prepared thumbnail image of each file from the external device with the attribute information of each file, such as the file name (including the extension), the data size and the like. The above devices may prepare the file display information for the preview, the icon view or the simple view in accordance with the received information.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

For example, in case that the information of the file which cannot be processed in the current processing mode is displayed by the simple view, when the above file cannot be processed in the other processing modes, the information indicating that the file cannot be processed in all of the processing modes may be displayed as the file information.

Further, even in case that the information of the file which can be processed in the current processing mode is displayed, the information indicating whether the above file can be processed in another processing mode or not may be displayed. For example, if there is another processing mode in which the file can be processed in addition to the current processing mode, the information indicating that the file can be processed in the above processing mode may be displayed on the display unit. Alternatively, the processing mode changing button for switching the processing mode to the above processing mode may be displayed. Further, the information of the processing mode in which the file cannot be processed may be displayed.

In the above embodiments, the display form for the information of the file which can be processed in the current processing mode is the preview or the like including the image information of the file and the display form for the information of the file which cannot be processed in the current processing mode is the simple view which does not include the image information of the file. However, the display forms of the file are not limited to the above display forms. As long as the display form (the first display form) for the information of the file which can be processed in the current processing mode is different from the display form (the second display form) for the information of the file which cannot be processed in the current processing mode, it can be suitably determined how the first display form is dissimilated from the second display form. For example, the color of the information, the display size for the information, or the shape of the display area for the information may be changed. Alternatively, the specific mark indicating whether the file can be processed or not may be attached to the information.

In the above embodiments, the case in which the file to be processed by the image processing apparatus 10 is selected, is explained as an example. The processing apparatus for processing the files is not limited to the image processing apparatus 10. As long as the apparatus has a plurality of processing modes for processing the files, any processing apparatus can be used. Further, the types of a plurality of processing modes are not limited to those of the above embodiments.

One of the objects of the above embodiments is to provide a display control device, an operation display device, an image processing apparatus, a display control method and a tangible computer-readable recording medium storing a program, which can display the information of the files so as to suitably confirm whether the file can be processed in one processing mode by the processing apparatus having a plurality of processing modes.

In at least one of the above embodiments, when the display control device or the like instructs the display unit to display the information of the files stored in the predetermined storing device, the display control device or the like instructs the display unit to display the information of the stored file which can be processed in a processing mode selected from a plurality of processing modes of the predetermined processing apparatus for processing the files, by using the first display form, and instructs the display unit to display the information of the stored file which cannot be processed in the selected processing mode, by the second display form. Thereby, the user can easily recognize whether the file can be processed in the current processing mode or not, in accordance with the difference in the display form for the file information.

In at least one of the above embodiments, when the display control device or the like instructs the display unit to display the information of the file which cannot be processed in the current processing mode and can be processed in another processing mode, the indication that the file can be processed in another processing mode is displayed. Thereby, the user can recognize whether the file which cannot be processed in the current processing mode can be processed in another processing mode or not without actually switching the processing mode.

In at least one of the above embodiments, when the display control device or the like instructs the display unit to display the information of the file which cannot be processed in the current processing mode and can be processed in another processing mode, the processing mode switching button for switching the selected processing mode to another processing mode in which the file can be processed is displayed as information relating to the file. The user can switch to the processing mode in which the file can be processed, by pushing the displayed processing mode switching button. Therefore, it is possible to change to the suitable processing mode without searching the processing mode in which the file can be processed from a plurality of processing modes.

In at least one of the above embodiments, when there is another processing mode in which the file can be processed in addition to the current processing mode, the display control device or the like instructs the display unit to display the indication that the file can be also processed in another processing mode.

In at least one of the above embodiments, in case that the processing mode is changed while the information of each file is displayed, the display form for the information of each file is updated according to whether the file can be processed in the changed processing mode or not.

In at least one of the above embodiments, when the information of the file of which a processable status is not changed by changing the processing mode is displayed, the information of the file is displayed by diverting the display information of the file, which is used before changing the processing mode. Thereby, only the display form for the information of the file of which the processable state is changed, is updated. It is possible to reduce the amount of data to be processed as compared with the case in which all of the display information is prepared and updated every time the processing mode is changed.

In at least one of the above embodiments, when the selection operation for selecting the file to be processed by the processing apparatus is received, the information of each file is displayed.

In at least one of the above embodiments, the files stored in the storing device provided in the display control device or the like, or the files stored in the external device connected to the display control device or the like, are displayed.

In at least one of the above embodiments, the display control device or the like controls the display contents displayed on the external display unit connected to the display control device or the like. The operating unit for receiving the selection of the processing mode may be provided in an optional place. For example, the operating unit can be provided in the device having the display unit or can be provided in the display control device.

In at least one of the above embodiments, the operating unit for receiving the processing mode selection operation and the file selection operation for selecting the file to be processed, the display unit and the display control device are integrally configured as the operation display device.

In at least one of the above embodiments, in the image processing apparatus having a plurality of processing modes, when the file to be processed is selected from the files stored in the storing device, the information of each file is displayed on the display unit by using the display form which is different according to whether the file can be processed in the current processing mode selected by the operating unit.

According to the display control device, the operation display device, the image processing apparatus, the display control method and the tangible computer-readable recording medium storing the program, which are disclosed in the above embodiments, it is possible to display the information of the files so as to be able to more suitably confirm whether the files can be processed by the processing apparatus having a plurality processing modes.

What is claimed is:

1. A display control device which is configured to instruct a predetermined display unit to display information of one or more files stored in a predetermined storing device,
wherein the display control device is configured to instruct the predetermined display unit to display the information of the stored file which can be processed in a processing mode selected from a plurality of processing modes of a predetermined processing apparatus for processing the file, by using a first display form, and to instruct the predetermined display unit to display the information of the stored file which cannot be processed in the selected processing mode, by using a second display form which is different from the first display form.

2. The display control device of claim 1, wherein when the display control device instructs the predetermined display unit to display the information of the file which cannot be processed in the selected processing mode and can be processed in another processing mode by the predetermined processing apparatus, the display control device instructs the predetermined display unit to display an indication that the file can be processed in the another processing mode.

3. The display control device of claim 2, wherein when the display control device instructs the predetermined display unit to display the information of the file which can be processed in the another processing mode, the display control device instructs the predetermined display unit to display a processing mode switching button for switching the selected processing mode to the another processing mode.

4. The display control device of claim 1, wherein when the display control device instructs the predetermined display unit to display the information of the file which can be processed in the selected processing mode and can be processed in another processing mode, the display control device instructs the predetermined display unit to display an indication that the file can be also processed in the another processing mode.

5. The display control device of claim 1, wherein when the selected processing mode is changed, the display control device updates a display form for the information of the file to be displayed according to whether the file can be processed in the changed processing mode or not.

6. The display control device of claim 1, wherein in case that the selected processing mode is changed, when the display control device instructs the predetermined display unit to display the information of the file of which a processable status is not changed between before and after changing the processing mode, the display control device diverts display information of the file, which is used for displaying the information of the file before changing the processing mode, in the changed processing mode.

7. The display control device of claim 1, wherein when the file to be processed by the processing apparatus is selected among the files stored in the storing device, the display control device instructs the predetermined display unit to display the information of the files stored in the storing device.

8. The display control device of claim 1, wherein the storing device is provided in the display control device or is an external device which is connected to the display control device.

9. The display control device of claim 1, wherein the display unit is an external device which is connected to the display control device.

10. An operation display device, comprising:
an operating unit to receive a selection of a processing mode to be carried out by a predetermined processing apparatus having a plurality of processing modes, and a selection of a file to be processed by the processing apparatus from a user;
a display unit; and
the display control device of claim 1, to instruct the display unit to display information of one or more files stored in a predetermined storing device, in accordance with the processing mode selected by using the operating unit.

11. An image processing apparatus, comprising:
an image processing unit having a plurality of processing modes;
an operating unit to receive a selection of one processing mode to be carried out by the image processing unit, and a selection of a file to be processed by the image processing unit from a user;
a display unit; and
the display control device of claim 1, to instruct the display unit to display information of one or more files stored in a predetermined storing device, in accordance with the processing mode of the image processing unit, which is selected by using the operating unit.

12. A display control method for displaying information of one or more files stored in a predetermined storing device on a predetermined display unit, the method comprising:
instructing the predetermined display unit to display the information of the stored file which can be processed in a processing mode selected from a plurality of processing modes of a predetermined processing apparatus for processing the file, by using a first display form, and instructing the predetermined display unit to display the information of the stored file which cannot be processed in the selected processing mode, by using a second display form which is different from the first display form.

13. The display control method of claim 12, wherein when the predetermined display unit is instructed to display the information of the file which cannot be processed in the selected processing mode and can be processed in another processing mode by the predetermined processing apparatus, the predetermined display unit is instructed to display an indication that the file can be processed in the another processing mode.

14. The display control method of claim 13, wherein when the predetermined display unit is instructed to display the information of the file which can be processed in the another processing mode, the predetermined display unit is instructed to display a processing mode switching button for switching the selected processing mode to the another processing mode.

15. The display control method of claim 12, wherein when the predetermined display unit is instructed to display the information of the file which can be processed in the selected processing mode and can be processed in another processing mode, the predetermined display unit is instructed to display an indication that the file can be also processed in the another processing mode.

16. A tangible computer-readable recording medium storing a program, wherein the program causes an information processing apparatus to execute:
instructing a predetermined display unit to display information of one or more files stored in a predetermined storing device; and
instructing the predetermined display unit to display the information of the stored file which can be processed in a processing mode selected from a plurality of processing modes of a predetermined processing apparatus for processing the file, by using a first display form, and instructing the predetermined display unit to display the information of the stored file which cannot be processed in the selected processing mode, by using a second display form which is different from the first display form.

17. The tangible computer-readable recording medium of claim 16, wherein when the program causes the information processing apparatus to instruct the predetermined display unit to display the information of the file which cannot be processed in the selected processing mode and can be processed in another processing mode by the predetermined processing apparatus, the program causes the information processing apparatus to instruct the predetermined display unit to display an indication that the file can be processed in the another processing mode.

18. The tangible computer-readable recording medium of claim 17, wherein when the program causes the information processing apparatus to instruct the predetermined display unit to display the information of the file which can be processed in the another processing mode, the program causes the information processing apparatus to instruct the predetermined display unit to display a processing mode switching button for switching the selected processing mode to the another processing mode.

19. The tangible computer-readable recording medium of claim 16, wherein when the program causes the information processing apparatus to instruct the predetermined display unit to display the information of the file which can be processed in the selected processing mode and can be processed in another processing mode, the program causes the information processing apparatus to instruct the predetermined display unit to display an indication that the file can be also processed in the another processing mode.

* * * * *